US011023568B2

(12) United States Patent
Sato

(10) Patent No.: US 11,023,568 B2
(45) Date of Patent: Jun. 1, 2021

(54) IMAGE PROCESSING APPARATUS, SYSTEM RELATED TO IMAGE PROCESSING APPARATUS, AND METHOD

(71) Applicant: CANON KABUSHIKI KAISHA, Tokyo (JP)

(72) Inventor: Tetsuya Sato, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 284 days.

(21) Appl. No.: 15/974,566

(22) Filed: May 8, 2018

(65) Prior Publication Data

US 2018/0341759 A1 Nov. 29, 2018

(30) Foreign Application Priority Data

May 24, 2017 (JP) ............................ JP2017-102858

(51) Int. Cl.
*G06F 21/32* (2013.01)
*H04L 29/06* (2006.01)
(Continued)

(52) U.S. Cl.
CPC ............ *G06F 21/32* (2013.01); *G06F 1/1643* (2013.01); *G06F 3/0488* (2013.01); *G06F 3/1204* (2013.01); *G06F 3/1222* (2013.01); *G06F 3/1238* (2013.01); *G06F 3/1267* (2013.01); *G06F 3/1285* (2013.01);
(Continued)

(58) Field of Classification Search
CPC ...... G06F 21/32; G06F 1/1643; G06F 3/0488; G06F 3/1204; G06F 3/1222; G06F 3/1238; G06F 3/1267; G06F 3/1285; G06F 21/608; G06K 9/00013; G06K 9/00087; G06K 9/00255; G06K 9/00288; H04L 9/0894;
(Continued)

(56) References Cited

U.S. PATENT DOCUMENTS 4,180,338 A * 12/1979 LaManna ................ B41J 3/387
400/582
9,904,863 B2 * 2/2018 Aoki ...................... G06F 21/32
(Continued)

FOREIGN PATENT DOCUMENTS

JP 2002-218146 A 8/2002
JP 2002-373070 A 12/2002
(Continued)

OTHER PUBLICATIONS

Journal of Multimedia, Distributed, Cooperative, and Mobile (DICOMO2007) Symposium, Information Processing Society of Japan, pp. 1322-1331.
(Continued)

*Primary Examiner* — Shahriar Zarrineh
(74) *Attorney, Agent, or Firm* — Canon U.S.A., Inc.

(57) ABSTRACT

An image processing apparatus communicates with a user's mobile terminal that includes an authentication module for biometric authentication. When the image processing apparatus receives verification data enabling use of a service provision system, the authentication module is identified as an authentication module to perform biometric authentication. The image processing apparatus then causes the authentication module to perform authentication processing of the user.

13 Claims, 15 Drawing Sheets

(51) Int. Cl.

| | |
|---|---|
| ***G06F 3/12*** | (2006.01) |
| ***G06F 21/60*** | (2013.01) |
| ***H04L 9/08*** | (2006.01) |
| ***H04L 9/32*** | (2006.01) |
| ***G06F 1/16*** | (2006.01) |
| ***G06F 3/0488*** | (2013.01) |
| ***G06K 9/00*** | (2006.01) |
| ***H04N 1/00*** | (2006.01) |

(52) U.S. Cl.
CPC ....... *G06F 21/608* (2013.01); *G06K 9/00013* (2013.01); *G06K 9/00087* (2013.01); *G06K 9/00255* (2013.01); *G06K 9/00288* (2013.01); *H04L 9/0894* (2013.01); *H04L 9/3231* (2013.01); *H04L 9/3247* (2013.01); *H04L 63/0861* (2013.01); *H04N 1/00209* (2013.01); *H04L 2209/80* (2013.01)

(58) Field of Classification Search
CPC . H04L 9/3231; H04L 9/3247; H04L 63/0861; H04L 2209/80; H04N 1/00209
See application file for complete search history.

(56) References Cited

U.S. PATENT DOCUMENTS

| | | | | |
|---|---|---|---|---|
| 9,906,525 | B1 * | 2/2018 | Avetisov | H04L 63/0861 |
| 10,291,820 | B2 * | 5/2019 | Kanno | H04N 1/4413 |
| 2002/0080250 | A1 * | 6/2002 | Ogawa | H04N 1/00278 348/231.6 |
| 2002/0083114 | A1 * | 6/2002 | Mazzagatte | G06F 3/1288 718/100 |
| 2005/0111857 | A1 * | 5/2005 | Negishi | G03G 15/6508 399/8 |
| 2005/0276519 | A1 * | 12/2005 | Kitora | G06Q 10/10 382/305 |
| 2007/0088950 | A1 * | 4/2007 | Wheeler | G07F 7/1016 713/170 |
| 2008/0174804 | A1 * | 7/2008 | Hsu | G06F 3/1253 358/1.15 |
| 2010/0011424 | A1 * | 1/2010 | Ushiku | H04L 9/3231 726/5 |
| 2013/0201532 | A1 * | 8/2013 | Takemoto | H04N 1/00015 358/406 |
| 2014/0049790 | A1 * | 2/2014 | Nakamura | G06F 3/1229 358/1.13 |
| 2015/0015909 | A1 | 1/2015 | Kaida | |
| 2015/0332273 | A1 * | 11/2015 | Bruno | G06Q 20/40145 705/44 |
| 2016/0087957 | A1 * | 3/2016 | Shah | H04L 63/08 726/1 |
| 2016/0248742 | A1 * | 8/2016 | Baghdasaryan | H04L 63/0884 |
| 2016/0371610 | A1 * | 12/2016 | Bronner | G06Q 20/045 |
| 2017/0264765 | A1 * | 9/2017 | Nobutani | G06F 3/1238 |
| 2018/0004928 | A1 * | 1/2018 | Hayashi | H04L 63/0861 |
| 2018/0019996 | A1 * | 1/2018 | Morita | H04L 63/0861 |
| 2018/0054435 | A1 * | 2/2018 | Sakamoto | H04L 9/3231 |
| 2018/0176215 | A1 * | 6/2018 | Perotti | H04W 76/10 |
| 2018/0250866 | A1 * | 9/2018 | Hasegawa | C08L 23/06 |
| 2019/0036917 | A1 * | 1/2019 | Sun | H04L 63/12 |

FOREIGN PATENT DOCUMENTS

| | | |
|---|---|---|
| JP | 2007-102278 A | 4/2007 |
| JP | 2016-502373 A | 1/2016 |
| JP | 2017-059172 A | 3/2017 |

OTHER PUBLICATIONS https://fidoalliance.org/how-fido-works/, published at least as of Jan. 29, 2017 https://fidoalliance.org/specs/fido-uaf-v1.1-ps-20170202/fido-uaf-overview-v1.1-ps-20170202 (XP055487398), FIDO Alliance proposed standard Feb. 2, 2017.

* cited by examiner

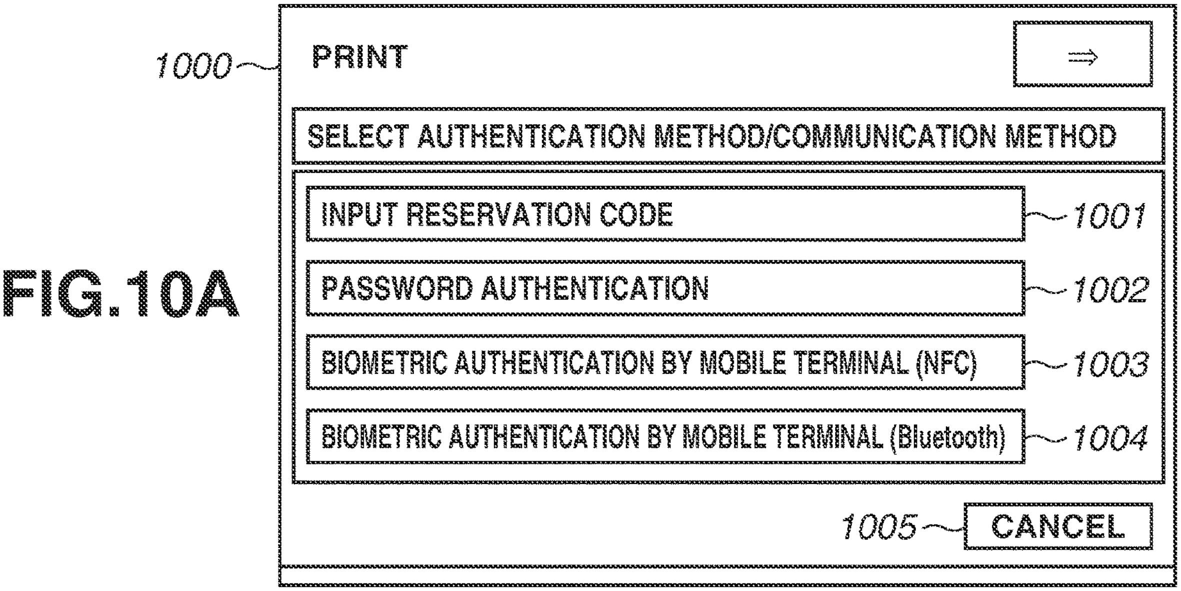

FIG.10A

1000 — PRINT  →

SELECT AUTHENTICATION METHOD/COMMUNICATION METHOD

| INPUT RESERVATION CODE | ~1001 |
| PASSWORD AUTHENTICATION | ~1002 |
| BIOMETRIC AUTHENTICATION BY MOBILE TERMINAL (NFC) | ~1003 |
| BIOMETRIC AUTHENTICATION BY MOBILE TERMINAL (Bluetooth) | ~1004 |

1005 — CANCEL

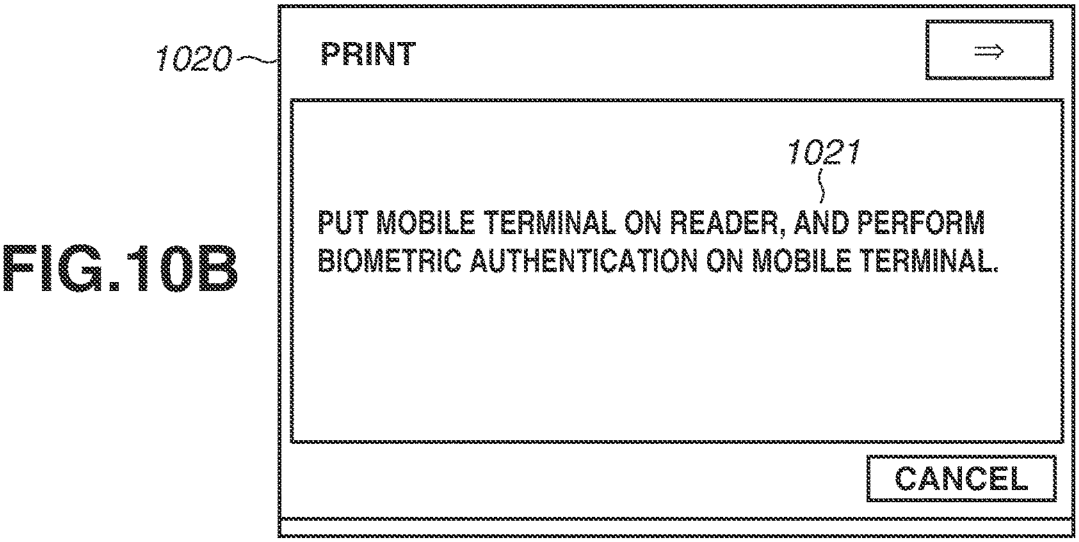

FIG.10B

1020 — PRINT  →

1021
PUT MOBILE TERMINAL ON READER, AND PERFORM BIOMETRIC AUTHENTICATION ON MOBILE TERMINAL.

CANCEL

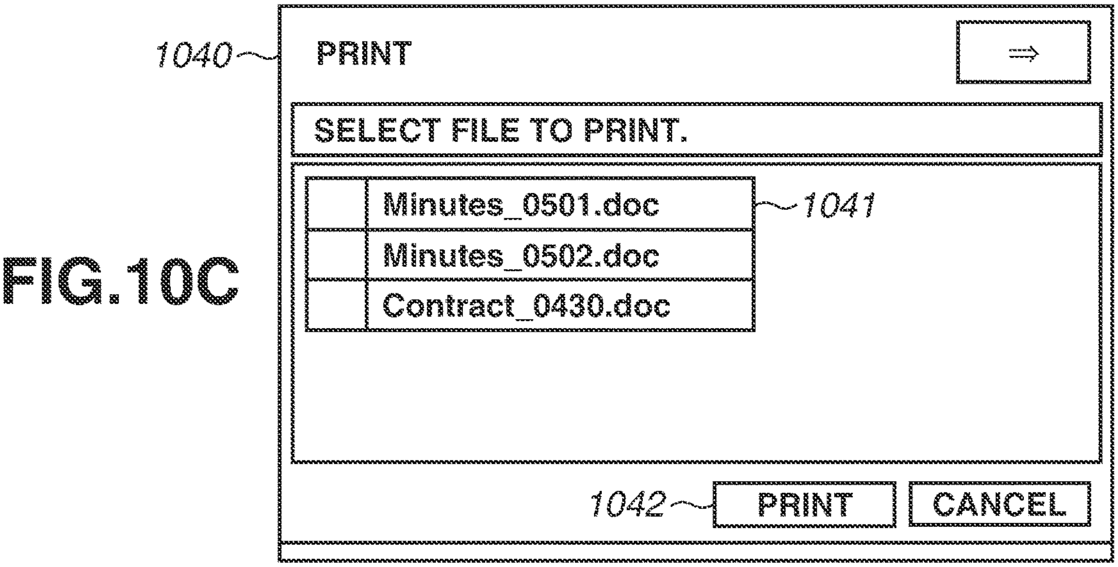

FIG.10C

1040 — PRINT  →

SELECT FILE TO PRINT.

| Minutes_0501.doc | ~1041 |
| Minutes_0502.doc |
| Contract_0430.doc |

1042 — PRINT  CANCEL

IMAGE PROCESSING APPARATUS, SYSTEM RELATED TO IMAGE PROCESSING APPARATUS, AND METHOD

BACKGROUND

Field

The present disclosure relates to a technique for providing a secure authentication method and improving user convenience in using network services including printing and storage services.

Description of the Related Art

Fast Identity Online (FIDO) is a recent new authentication system including biometric authentication.

Unlike a password in identifier (ID)/password authentication, biometric information used in biometric authentication, such as fingerprints and a vein pattern, is not rewritable when the information leaks outside. Information leakage is thus fatal to biometric authentication. By contrast, FIDO involves performing an advance registration operation on an authentication server from the user's own device, whereby a secret key associated with biometric information is registered in the device and a public key in the server. Authentication is performed on the user's device instead of on the server via the Internet, and a signature generated by using the secret key flows through the network as an authentication result. In other words, the risk of information leakage is low since the biometric information does not flow through the network.

A system in which a multifunction peripheral (MFP) serving as an image processing apparatus is installed in a public space, such as a convenience store and a hotel, and data stored in a cloud or other print system is downloaded and printed (pull-printed) is known. In such a system, the print system issues a reservation code when the user registers data to be printed in the print system. If the reservation code is input to an operation panel of the MFP in the public space, the data in the print system can be downloaded and printing can be started. Such a system, however, may not be secure since printing can be performed with only a reservation code. In other words, anyone can print the data if the reservation code is becomes known.

A system that accepts input of a user ID and a password of a user registered in a print system at an operation panel of an MFP and performs user authentication has been discussed (see Japanese Patent Application Laid-Open No. 2002-373070). Such a configuration with user authentication is more secure than printing with only the input of a reservation code.

There is another system that accepts the input of a user ID and a password at an operation unit of an image processing apparatus, provides network storage services (or access-permitted storage locations) associated with the authenticated user, and stores data input to the image processing apparatus into a selected storage.

However, if authentication is performed on a service provision system such as a print system, there remains the risk of information leakage since confidential information, such as a password, flows through the network. The need to input a user ID and a password to the operation unit is not always convenient. If a user ID and a password are input to the operation unit of an apparatus installed in a public space, such as a hotel, there is also a risk a third party observing the information being entered.

Suppose that a secure authentication method like FIDO is applied to perform authentication using biometric information instead of inputting a user ID and a password to the operation unit of an apparatus such as an image processing apparatus. In such a case, biometric information and a corresponding secret key may need to be registered in an authentication system in the apparatus. For example, registering biometric information, which is an individual's private information, and a secret key into the MFP in a public space may not be secure. In addition, a user who uses a plurality of hotels or convenience stores may need to perform the registration operation on a plurality of apparatuses, which is not very convenient.

SUMMARY

According to an aspect of the present disclosure, an image processing apparatus having a communication function capable of communicating with a mobile terminal including an authentication module for biometric authentication and a storage area having tamper resistance, wherein the storage area is configured to store biometric information about a user and a secret key generated in registering the biometric information, the biometric information being needed when the authentication module performs authentication processing, includes a memory storing instructions, and at least one processor executing the instructions to cause the image processing apparatus to, identify, in a case where verification data issued to use a service provision system is received, an authentication module to perform biometric authentication, transmit, when the authentication module included in the mobile terminal is identified as the authentication module to perform biometric authentication, the verification data to the mobile terminal, and transmit, in a case where signature data generated by using the secret key stored in the storage area of the mobile terminal and the verification data is returned in response to a success of authentication processing of the user by the authentication module of the mobile terminal, the signature data to an issuer of the verification data, wherein, in a case where the signature data is verified by the issuer of the verification data by using a public key corresponding to the secret key generated by the mobile terminal, the service provision system provides a service for the image processing apparatus.

Further features will become apparent from the following description of exemplary embodiments with reference to the attached drawings.

BRIEF DESCRIPTION OF THE DRAWINGS

FIGS. 10A, 10B, and 10C are diagrams illustrating examples of screens displayed on a multifunction peripheral (MFP) according to the first exemplary embodiment.

DESCRIPTION OF THE EMBODIMENTS

A mode for carrying out the present disclosure will be described below with reference to the drawings.

<System Configuration>

Figure 1:
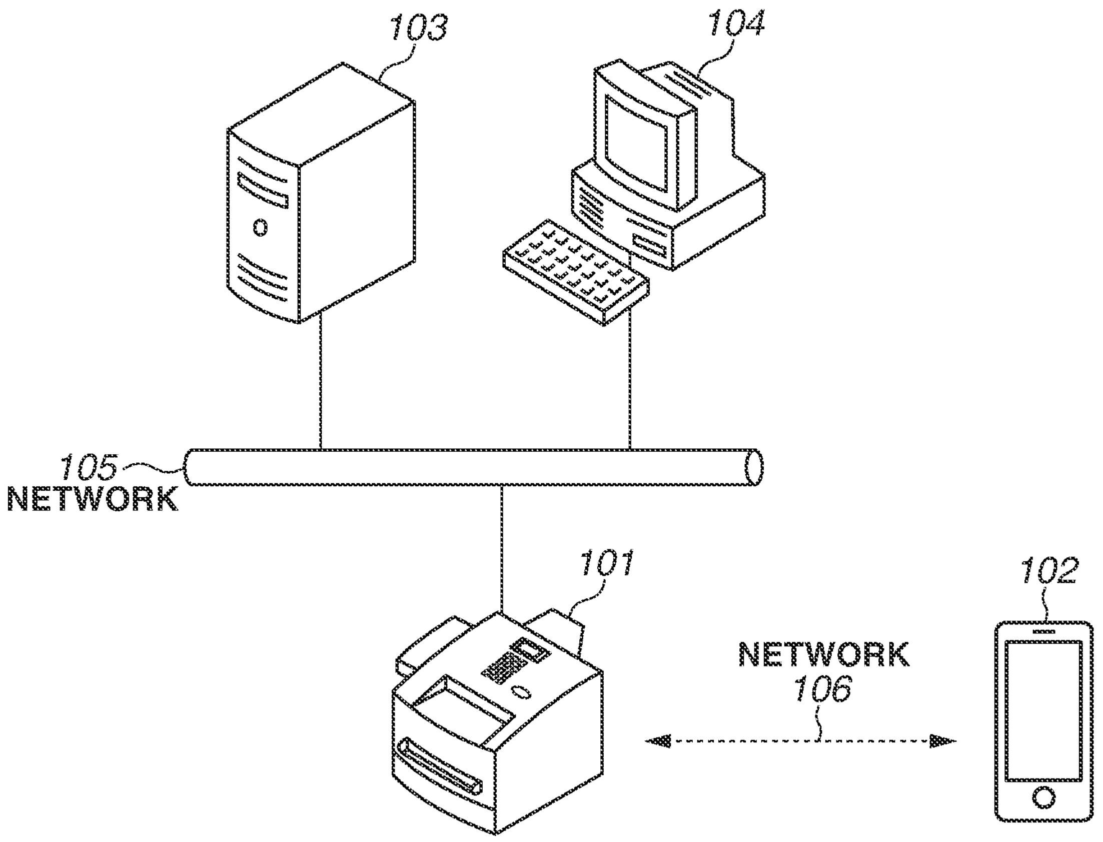
FIG. 1 is a schematic diagram illustrating an example of an overall configuration of a system.

FIG. 1 is a schematic diagram illustrating an overall configuration of a system according to a first exemplary embodiment. The system includes a multifunction peripheral (MFP) 101 that is an example of an image processing apparatus, a mobile terminal 102 that is owned by a user, a print system 103 that is an example of a service provision system, and a client personal computer (PC) 104. As described below, an exemplary embodiment is also applicable to a network storage service for storing data input by an apparatus, such as an MFP, and a service provision system for providing a social networking service (SNS) provision service, aside from the print system 103.

The MFP 101 is an example of an apparatus that can be installed in a public space and to which the present exemplary embodiment is applicable. Aside from the MFP 101, the present exemplary embodiment is also applicable to a printer, an apparatus including an image input device like a scanner and a camera, digital health-care equipment (such as a sphygmomanometer and a treadmill), an automatic teller machine (ATM), and an image processing apparatus such as a three-dimensional (3D) printer (for printing a 3D object).

The MFP 101, the print system 103, and the client PC 104 are connected via a network 105. For example, the network 105 can be any one of the Internet, a local area network (LAN), a wide area network (WAN), a telephone line, a dedicated digital line, an ATM or frame relay line, a cable television line, or a data broadcasting wireless line. A communication network constructed by combining such network lines is also applicable.

The MFP 101 is also connected to the mobile terminal 102 via a network 106. Examples of the network 106 can include near field communication (NFC), Bluetooth® and other short-range communications, in addition to the foregoing network lines such as a LAN.

The client PC 104 is not limited to a desktop PC, and can be a notebook PC or a mobile terminal (smartphone or tablet).

The mobile terminal 102 refers to a notebook PC, a mobile terminal (smartphone or tablet), or a wearable terminal such as a smartwatch or smartglasses.

<Internal Configuration of Information Processing Apparatus>

Figure 2A:
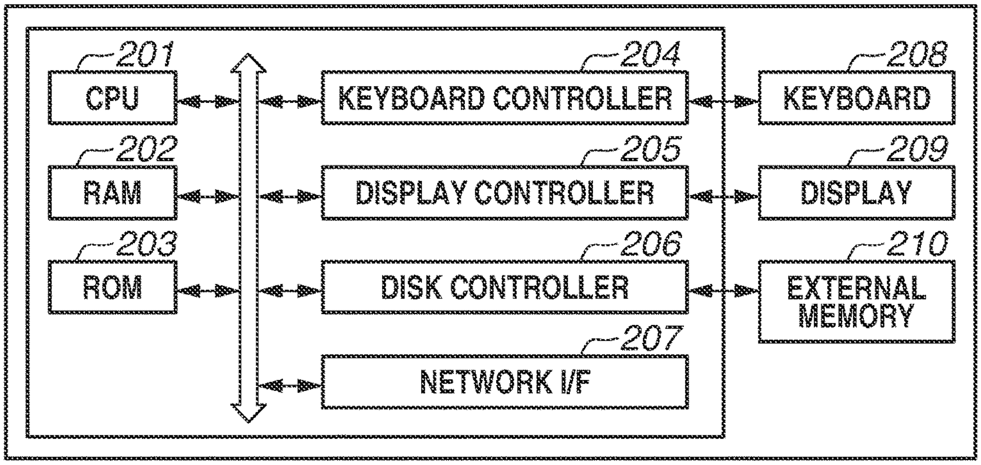
FIGS. 2A, 2B, and 2C are block diagrams illustrating examples of internal configurations of apparatuses.

FIG. 2A is a diagram illustrating an example of an internal configuration of a server PC and the client PC 104 that constitute the print system 103. Such PCs can be configured by hardware of an ordinary information processing apparatus.

A central processing unit (CPU) 201 executes a program stored in a read-only memory (ROM) 203, and programs such as an operating system (OS) and an application that are loaded from an external memory 210 into a random access memory (RAM) 202. In other words, the CPU 201 functions as various processing units for performing the processing of flowcharts described below by executing the programs stored in the readable storage media. The RAM 202 is a main memory of the CPU 201, and functions as a work area. A keyboard controller 204 controls operation inputs from a keyboard 208 and a not-illustrated pointing device (such as a mouse, a touch pad, a touch panel, and a trackball). A display controller 205 controls display of a display 209. A disk controller 206 controls data access to the external memory 210 that stores various types of data. Examples of the external memory 210 include a hard disk (HD) and a flexible disk (FD). A network interface (I/F) 207 is connected to the network 105 and performs communication control processing with other apparatuses connected to the network 105.

<Internal Configuration of Image Processing Apparatus>

Figure 2B:
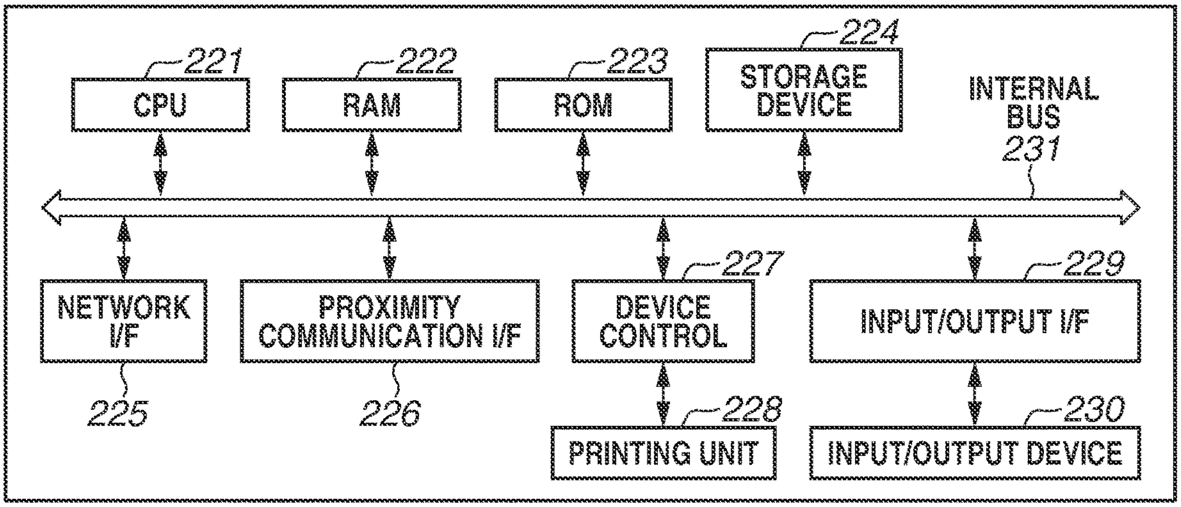

FIG. 2B is a diagram illustrating an example of an internal configuration of the MFP 101.

A CPU 221 executes programs stored in a ROM 223 (including programs for implementing processing described below), and controls devices in a centralized manner via an internal bus 231. A RAM 222 functions as a memory and a work area of the CPU 221. A network I/F 225 exchanges data with external network devices in a one- or two-way manner. A proximity communication I/F 226 is a network I/F for proximity communication such as NFC and Bluetooth®. The proximity communication I/F 226 communicates and exchanges data with the mobile terminal 102. A device control 227 controls a printing unit 228. The CPU 221 performs program execution processing with the RAM 222 and the ROM 223, and performs processing for recording image data on a recording medium such as a storage device 224. The storage device 224 functions as an external storage device.

An input/output device 230 represents a plurality of configurations in charge of input and output of the MFP 101. Specifically, the input/output device 230 accepts input (such as a button input) from the user, and transmits a signal corresponding to the input to the processing units described above via an input/output I/F 229. The input/output device 230 also includes a display device (such as a touch panel) for providing needed information to the user and accepting user operations. The input/output device 230 can further include a scanning device for reading a document and accepting electronic data as an input.

<Internal Configuration of Mobile Terminal>

Figure 2C:
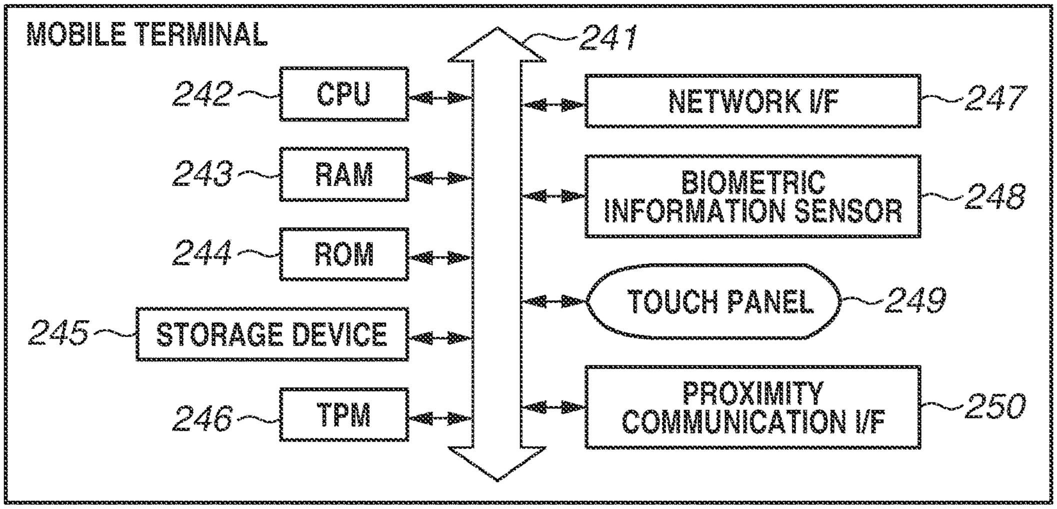

FIG. 2C is a diagram illustrating an example of an internal configuration of the mobile terminal 102.

A CPU 242 executes programs stored in a ROM 244 (including programs for implementing processing to be described below), and controls devices in a centralized manner via an internal bus 241. A RAM 243 functions as a memory and a work area of the CPU 242. A network I/F 247 exchanges data with external network devices in a one- or two-way manner by using WiFi®. The CPU 242 performs program execution processing with the RAM 243 and the ROM 244, and performs processing for recording data on a recording medium such as a storage device 245. The storage device 245 functions as an external storage device, and includes a Secure Digital (SD) card.

A Trusted Platform Module (TPM) 246 is a storage unit that processes and stores confidential information and includes tamper resistance that prevents stored data from being externally read. In the present exemplary embodiment, the TPM 246 stores biometric information itself for use in biometric authentication, or a feature amount of the biometric information, and a secret key corresponding to the biometric information. In the following description, a feature amount of a signal indicating biometric information successfully obtained by a sensor is referred to as biometric information. A biometric information sensor 248 is a sensor for reading biometric information about the user. For example, the biometric information sensor 248 reads and converts information about the user's fingerprint, iris, vein, voiceprint, and/or face image into a signal. The biometric information sensor 248 is implemented by using a dedicated reader, a camera, and/or a microphone.

A touch panel 249 includes two functions, a display function and an input function. The touch panel 249 displays an application screen and a keyboard. If the user applies pressure to the screen with the user's hand or a dedicated pen, the touch panel 249 outputs touched screen position information externally as an information signal. The application uses the output information signal, whereby the user can operate the application via the touch panel 249. The biometric information sensor 248 and the touch panel 249 can be implemented in a stacked manner so that the user's fingerprint information can be read from an operation on the touch panel 249.

Like the proximity communication I/F 226 of the MFP 101, a proximity communication I/F 250 is an I/F corresponding to a communication method for proximity communication such as NFC and Bluetooth®. In the present exemplary embodiment, the mobile terminal 102 communicates with the MFP 101 via the proximity communication I/F 250.

<Functional Configuration of MFP>

Figure 3A:
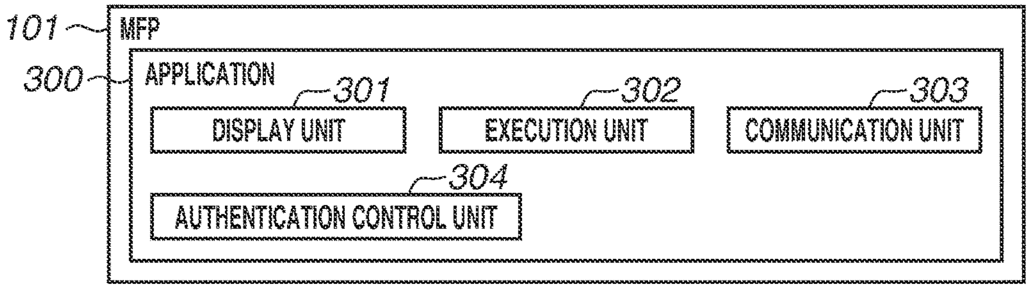
FIGS. 3A, 3B, 3C, and 3D are block diagrams illustrating examples of functional configurations of the apparatuses.

FIG. 3A is a block diagram illustrating an example of a functional configuration of the MFP 101. An application 300 runs on the MFP 101. The application 300 is implemented by the CPU 221 reading a program stored in the ROM 223 of the MFP 101 into the RAM 222 and executing the program.

The application 300 includes a display unit 301, an execution unit 302, a communication unit 303, and an authentication control unit 304. The display unit 301 is a software module that displays a user interface (UI) for listing print data and a UI for accepting print execution on a display device. The execution unit 302 is a software module that controls the printing unit 228 of the MFP 101 to execute printing of print data. The communication unit 303 is a software module that communicates with external apparatuses, such as the print system 103, by using the network I/F 225 and the proximity communication I/F 226. The authentication control unit 304 is a software module that makes a request for authentication processing to an authenticator inside the MFP 101 or an authenticator provided outside via the network 106, and accepts an authentication result. In the present example, the authentication control unit 304 is described to make a request for biometric authentication to an external authenticator (mobile terminal 102) via the proximity communication I/F 226.

In the present example, the authentication control unit 304 is included in the application 300. However, this is not restrictive. For example, the authentication control unit 304 can be configured independent of the application 300 so that the application 300 calls the independent authentication control unit 304. The independent configuration of the authentication control unit 304 enables the authentication control unit 304 to be called not only by the application 300 but also by other applications.

<Functional Configuration of Mobile Terminal>

Figure 3B:
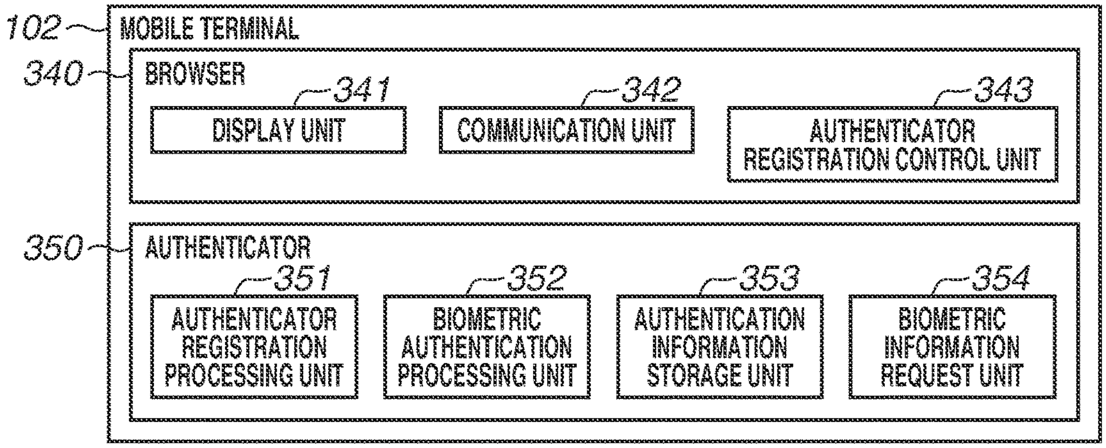

FIG. 3B is a block diagram illustrating an example of a functional configuration of the mobile terminal 102. A browser 340 and an authenticator 350 run on the mobile terminal 102. The browser 340 and the authenticator 350 are implemented by the CPU 242 reading programs stored in the ROM 244 of the mobile terminal 102 into the RAM 243 and executing the programs.

The browser 340 includes a display unit 341, a communication unit 342, and an authenticator registration control unit 343. The display unit 341 is a software module that displays a Hypertext Markup Language (HTML) document obtained by the communication unit 342 and accepts the user's operations by using the touch panel 249. The communication unit 342 is a software module that communicates with an external apparatus, such as the print system 103, via the network I/F 247. The authenticator registration control unit 343 is a software module that makes a generation request for a credential to an authenticator. In the present example, the authenticator registration control unit 343 is described to make a generation request for a credential to the authenticator 350. While in the present example the authenticator registration control unit 343 is included in the browser 340, this is not restrictive. For example, the authenticator registration control unit 343 can be configured independent of the browser 340 so that the browser 340 calls the independent authenticator registration control unit 343. The independent configuration of the authenticator registration control unit 343 enables the authenticator registration control unit 343 to be called not only by the browser 340 but also by other applications.

The authenticator 350 is an authentication module that supports biometric authentication using the biometric information sensor 248. The authenticator 350 includes an authenticator registration processing unit 351, a biometric authentication processing unit 352, an authentication information storage unit 353, and a biometric information request unit 354. The authenticator registration processing unit 351 is a software module that accepts a generation request for a credential from the authenticator registration control unit 343 of the browser 340, and generates a pair of keys (a secret key and a public key) and a credential. The biometric authentication processing unit 352 is a software module that accepts a biometric authentication request from the authentication control unit 304 of the application 300 and performs biometric authentication by using the biometric information sensor 248. The authentication information storage unit 353 is a software module that stores authentication information described below with reference to Table A into the TPM 246. The biometric information request unit 354 is a software module that displays a UI for accepting input of biometric information about the user on the touch panel 249.

<Functional Configuration of Print System>

Figure 3C:
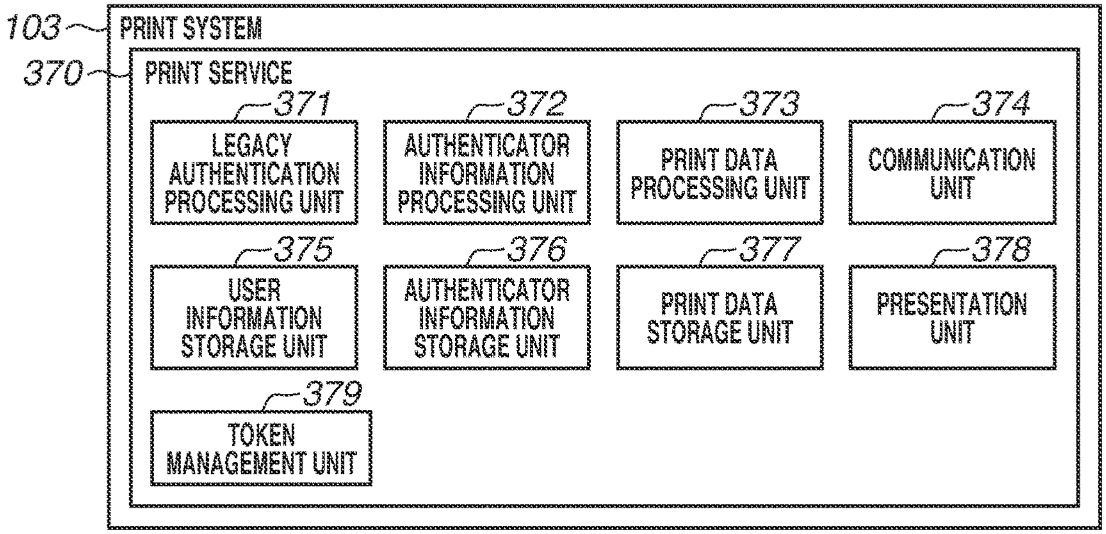

FIG. 3C is a block diagram illustrating an example of a functional configuration of the print system 103. A print service 370 runs on the print system 103. The print service 370 is implemented by the CPU 201 reading a program stored in the ROM 203 of the server PC constituting the print system 103 into the RAM 202 and executing the program.

The print service 370 includes a legacy authentication processing unit 371, an authenticator information processing unit 372, a print data processing unit 373, and a communication unit 374. The print service 370 also includes a user information storage unit 375, an authenticator information storage unit 376, a print data storage unit 377, a presentation unit 378, and a token management unit 379.

In the present example, for the sake of distinction from biometric authentication, authentication for verifying the coincidence of user IDs and passwords will be referred to as legacy authentication. The legacy authentication processing unit 371 is a software module that verifies whether a user ID and a password included in a legacy authentication request received by the communication unit 374 coincide with a user ID and a password stored in the user information storage unit 375.

The authenticator information processing unit 372 is a software module that stores information about an authenticator into the authenticator information storage unit 376 by using a credential received by the communication unit 374. The authenticator information processing unit 372 verifies assertion information (assertion), received by the communication unit 374. The print data processing unit 373 is a software module that registers print data in the print data storage unit 337 and obtains print data in response to registration and acquisition requests for print data, received by the communication unit 374. The communication unit 374 is a software module that communicates with the MFP 101, the mobile terminal 102, and the client PC 104, and accepts requests.

The user information storage unit 375 is a software module that stores user information described below with reference to Table B into the external memory 210 or an external storage system (not-illustrated). The authenticator information storage unit 376 is a software module that stores authenticator information described below with reference to Table E into the external memory 210 or the external storage system (not illustrated). The print data storage unit 377 is a software module that stores print data described below with reference to Table C into the external memory 210 or the external storage system (not illustrated).

The presentation unit 378 is a software module that generates an HTML document based on a screen acquisition request, such as an acquisition request for an authenticator registration screen, received by the communication unit 374. The token management unit 379 is a software module that issues and verifies a token.

<Functional Configuration of Client PC>

Figure 3D:
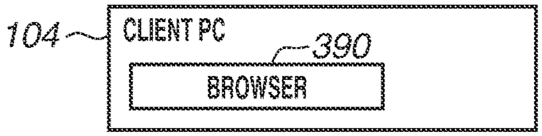

FIG. 3D is a block diagram illustrating an example of a functional configuration of the client PC 104. A browser 390 runs on the client PC 104. The browser 390 is implemented by the CPU 201 reading a program stored in the ROM 203 of the client PC 104 into the RAM 202 and executing the program.

The browser 390 is a software module that displays an obtained HTML document and accepts the user's operations. The browser 390 is a software module that communicates with external apparatuses such as the print system 103.

<Table Managed by Mobile Terminal>

Table A is an example of an authentication information management table managed by the mobile terminal 102. The authentication information management table illustrates information that the authentication information storage unit 353 of the authenticator 350 stores into the TPM 246.

TABLE A

Authentication Information Management Table

| Authentication information ID | Service ID | Secret key | Biometric information ID |
|---|---|---|---|
| 407c-8841-79d | pull-print.com | 1faea2da-a269-4fa7-812a-509470d9a0cb | d493a744 |
| 4c04-428b-a7a2 | pull-print.com | d7ae30c8-3775-4706-8597-aaf681bc30f5 | dcc97daa |
| 92b2-498d-bea6 | service-a.com | 36ea5eed-732b-4b05-aa7b-4dddb4be3267 | 51caacaa |
| . . . | . . . | . . . | . . . |

In the authentication information management table, one record represents one entry of authentication information. An authentication information ID column stores IDs unique to respective entries of authentication information. A service ID column stores IDs for uniquely identifying intended services, such as the print service 370 of the print system 103. In the present example, information about a top-level domain and a second-level domain is stored in the service ID column. For example, if the print service 370 has a uniform resource locator (URL) of http://www.pull-print.com, pull-print.com is stored in the service ID column. A secret key column stores secret keys. Public keys corresponding to the secret keys stored in the secret key column are registered in services described in the service ID columns. A biometric information ID column stores IDs corresponding to feature amounts of biometric information. A procedure for storing the pieces of information corresponding to the respective columns of the authentication information management table and a procedure for storing a public key into the print service 370 will be described below.

<Tables Managed by Print System 103>

Tables B to F are examples of tables managed by the print service 370 of the print system 103.

TABLE B

User Information Management Table

| User ID | Password | Mail address |
|---|---|---|
| user001 | ************ | user001@co.jp |
| user004 | ************ | user004@co.jp |
| . . . | . . . | . . . |

Table B is a user information management table, which is managed by the user information storage unit 375 of the print service 370. In the user information management table, one record represents one entry of user information. A user ID column stores IDs for uniquely identifying users of the print service 370. A password column stores passwords for authenticating the users. A mail address column stores the users' mail addresses. Aside from the mail addresses, attribute information about users, such as the users' addresses, can also be stored in the user information management table.

TABLE C

Print Data Management Table

| Data name | Print data | User ID | Reservation code |
|---|---|---|---|
| Minutes_0501.doc | 010100101010101010 . . . | user001 | xbrgtaca |
| Minutes_0502.doc | 001010010101001111 . . . | user001 | adtcac12 |
| Contract_0501.doc | 0111110101101110111 . . | user001 | tdcca876 |
| . . . | . . . | . . . | . . . |

Table C is a print data management table, which is managed by the print data storage unit 377 of the print service 370. In the print data management table, one record represents one entry of print data. A data name column includes the names of data printed by the users. The names are displayed on the MFP 101 in a print flow described below. A print data column stores binary data of the print data to be printed. A user ID column stores IDs for uniquely identifying the print-instructing users of the print service 370. A reservation code column uniquely identifies the pieces of print data. In the print flow to be described below, a reservation code identifies print data to be printed when specified by the user on the MFP 101.

TABLE D

Attestation Challenge Management Table

| Attestation challenge | User ID | Expiration date |
|---|---|---|
| 65C9B063-9C33 | user001 | 2017-05-05T12:00:34Z |
| 7317EFBA-4E63 | user001 | 2017-05-02T12:03:12Z |
| . . . | . . . | . . . |

Table D is an attestation challenge management table, which is managed by the user information storage unit 375 of the print service 370. In the attestation challenge management table, one record represents information about one attestation challenge. An attestation challenge is a parameter used as verification data for performing challenge response authentication. Attestation challenges are issued user by user. Processing for issuing an attestation challenge will be described below. An attestation challenge column stores attestation challenges. A user ID column stores user IDs with which the attestation challenges are issued. An expiration date column stores the expiration dates of the attestation challenges.

TABLE E

Authenticator Information Management Table

| Authentication information ID | Public key | User ID |
|---|---|---|
| 407c-8841-79d | AC43C5FB-BFA2-48D1-A71B-FB04ACDA347A | user001 |
| 4c04-428b-a7a2 | 8143CA9F-35C9-4333-948F-BFCE66A74310 | user002 |
| . . . | . . . | . . . |

Table E is an authenticator information management table, which is managed by the authenticator information storage unit 376 of the print service 370. In the authenticator information management table, one record represents one entry of authenticator information. An authentication information ID column stores the values of the authentication information ID column in Table A. A public key column stores public keys to be paired with the secret keys in Table A, generated by the authenticator. In other words, if a secret key and a public key in Tables A and E have the same authentication information ID, data encrypted with the secret key of Table A can be decrypted by the public key of Table E. A user ID column stores IDs for uniquely identifying the users of the print service 370.

TABLE F

Token Management Table

| Token | User ID | Expiration date |
|---|---|---|
| 3FD4FA-AA4-56DC-B45F-45BCD65AC45D | user001 | 2017-05-02T13:14:31Z |
| EC51DC-36C4-4BC3-54CF-31ECE6CACBF0 | user003 | 2017-05-02T13:31:32Z |
| . . . | . . . | . . . |

Figure 7A:
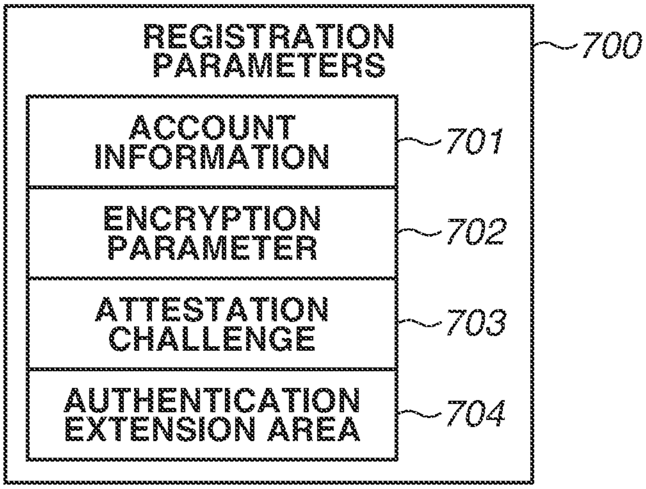
FIGS. 7A, 7B, and 7C illustrate examples of parameters related to the registration of an authenticator.
Figure 7B:
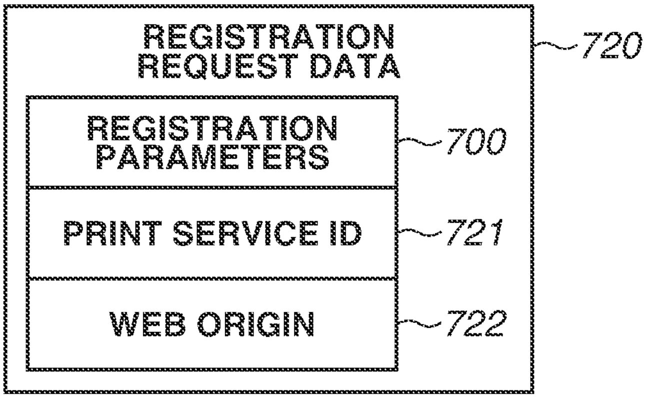

Table F is a token management table, which is managed by the user information storage unit 375 of the print service 370. The print service 370 issues a token if authentication processing succeeds. The application 300 attaches the issued token to a print data list request when making the request to the print service 370. Such processing will be described below with reference to FIGS. 7A, 7B, and 7C. In the token management table, one record represents information about one token. A token column stores tokens. A user ID column stores the IDs for uniquely identifying the users of the print service 370. An expiration date column stores the expiration dates of the tokens. The print service 370 accepts a request if the token attached to the request is included in the token column of the token management table and the expiration date of the token in the expiration date column has not passed.

<Print Data Registration Processing>

Registration of print data from the client PC 104 will be described with reference to FIGS. 4, 5A, and 5B.

Figure 4:
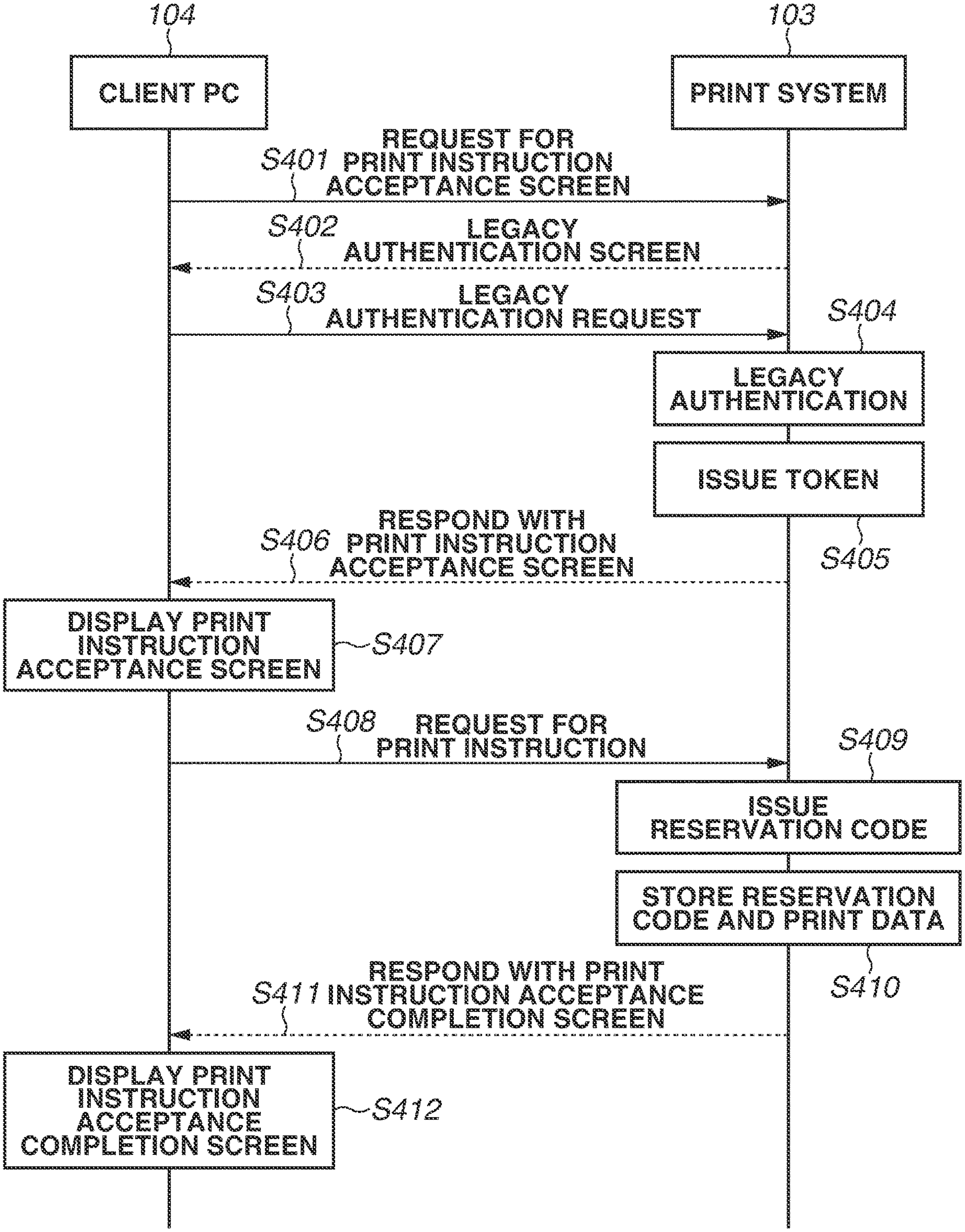
FIG. 4 is a sequence diagram illustrating processing for registering print data.
Figure 5A:
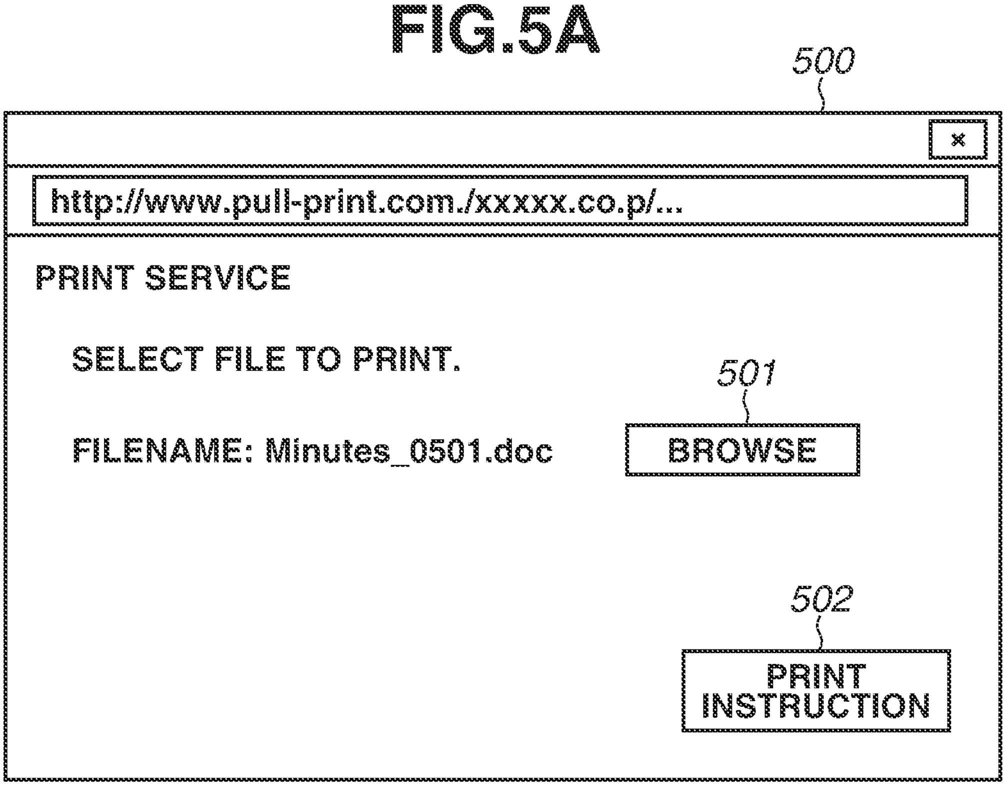
FIGS. 5A and 5B are diagrams illustrating examples of screens displayed on a client personal computer (PC).

FIG. 4 is a sequence diagram illustrating print data registration processing of the print system 103 and the client PC 104. The user initially inputs the URL of a print instruction acceptation screen into the browser 390 of the client PC 104.

In step S401, the browser 390 of the client PC 104 accepts the input of the URL of the print instruction acceptance screen, and makes a request for the print instruction acceptance screen to the print service 370. Since authentication is not yet performed at the first access, the request is redirected to a legacy authentication screen. In step S402, the print service 370 returns the legacy authentication screen to the browser 390. The browser 390 displays the legacy authentication screen and accepts input of a user ID and a password. If the input of a user ID and a password by user operations is accepted, then in step S403, the browser 390 transmits a legacy authentication request to the print service 370 with the accepted user ID and password as parameters. In step S404, the legacy authentication processing unit 371 of the print service 370 performs legacy authentication. Specifically, the legacy authentication processing unit 371 verifies whether the user ID and password included in the legacy authentication request coincide with a user ID and password stored in the user information storage unit 375. If the user IDs and passwords do not coincide, the legacy authentication processing unit 371 returns an authentication error to the browser 390 of the client PC 104. The sequence diagram of FIG. 4 illustrates a case where the legacy authentication succeeds. In step S405, the token management unit 379 of the print service 370 issues a token, and stores information about the token into the token management table of the user information storage unit 375, described with reference to Table F. In step S406, the communication unit 374 of the print service 370 responds to the browser 390 of the client PC 104 with a print instruction acceptance screen generated by the presentation unit 378. The token issued in step S405 is included in the response of step S406. For example, the token is set in a cookie.

In step S407, the browser 390 displays the print instruction acceptance screen. The print instruction acceptance screen will be described with reference to FIG. 5A. A UI 500 represents the print instruction acceptance screen. The browser 390 analyzes and displays the HTML document of the print instruction acceptance screen received as the response in step S406. A button 501 is a button for selecting a file to be printed. A button 502 is a button for giving a print instruction to the print service 370 of the print system 103. If the button 502 is pressed, the file selected to be printed starts to be registered in the print service 370.

Returning to the description of FIG. 4, if the browser 390 accepts the pressing of the button 502, the processing proceeds to step S408.

In step S408, the browser 390 makes a request for a print instruction to the print system 103 to register print target data with the print service 370 of the print system 103. The request for a print instruction includes data of the file to be printed and the token. The token management unit 379 of the print service 370 verifies whether the token included in the request for a print instruction is valid. Specifically, the token management unit 379 of the print service 370 checks whether the token included in the request for a print instruction is found in the foregoing token management table (Table F) and has not passed the expiration date. If the token is invalid, the token management unit 379 returns an authentication error to the browser 390 of the client PC 104. The sequence diagram of FIG. 4 illustrates a case where the token is valid.

In step S409, the print data processing unit 373 of the print service 370 issues a reservation code. In step S410, the print data processing unit 373 of the print service 370 stores the reservation code issued in step S408 and the print data received in step S407 into the foregoing print data management table (Table C). In step S411, the communication unit 374 of the print service 370 responds to the browser 390 of the client PC 104 with a print instruction acceptance completion screen generated by the presentation unit 378. In step S412, the browser 390 displays the print instruction acceptance completion screen (FIG. 5B).

Figure 5B:
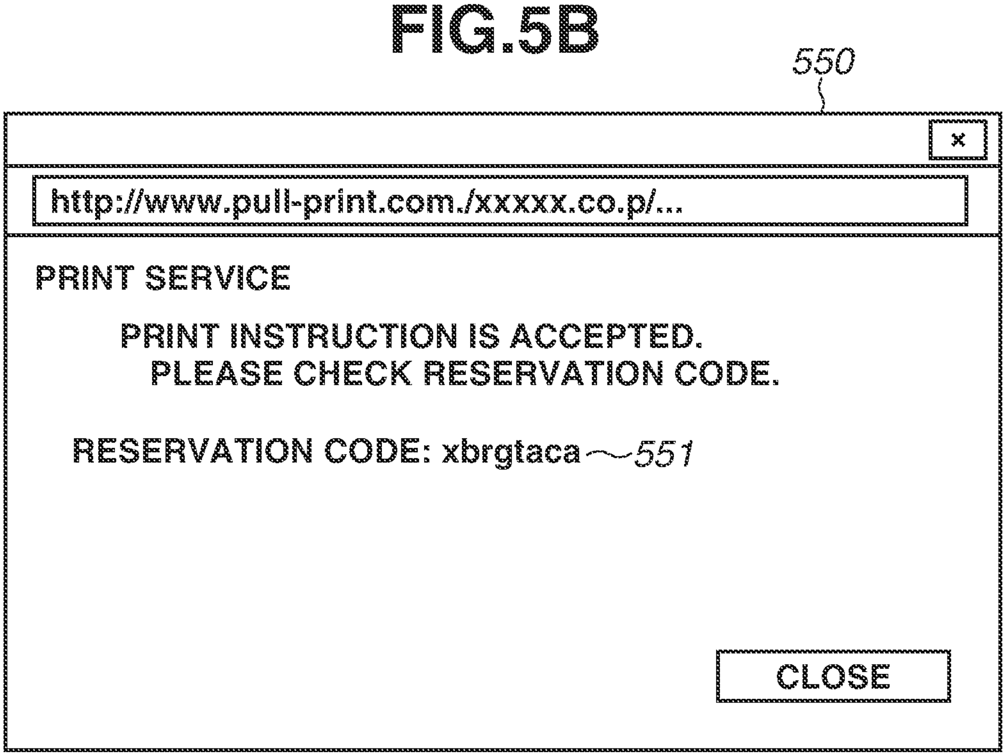

In FIG. 5B, a UI 550 represents the print instruction acceptance completion screen. The browser 390 analyzes and displays the HTML document of the print instruction acceptance completion screen received as the response in step S411. A text area 551 shows the reservation code of the print data for which the print instruction is accepted. The user can specify the print data for the print service 370 by inputting the reservation code from the operation unit of the MFP 101. The specification of print data by using a reservation code will be described below.

In the present example, the browser 390 of the client PC 104 performs the processing for registering print data. In the case of printing a file stored in the mobile terminal 102, the browser 340 of the mobile terminal 102 can perform the processing. The print service 370 can provide the reservation code to an electronic mail address of the user succeeding in the legacy authentication in step S404.

<Processing for Registering Authenticator>

Processing for registering an authenticator in the print service 370 of the print system 103 will be described with reference to FIGS. 6 to 8. Here, an example of registering information about the authenticator 350 of the mobile terminal 102 will be described.

Figure 6:
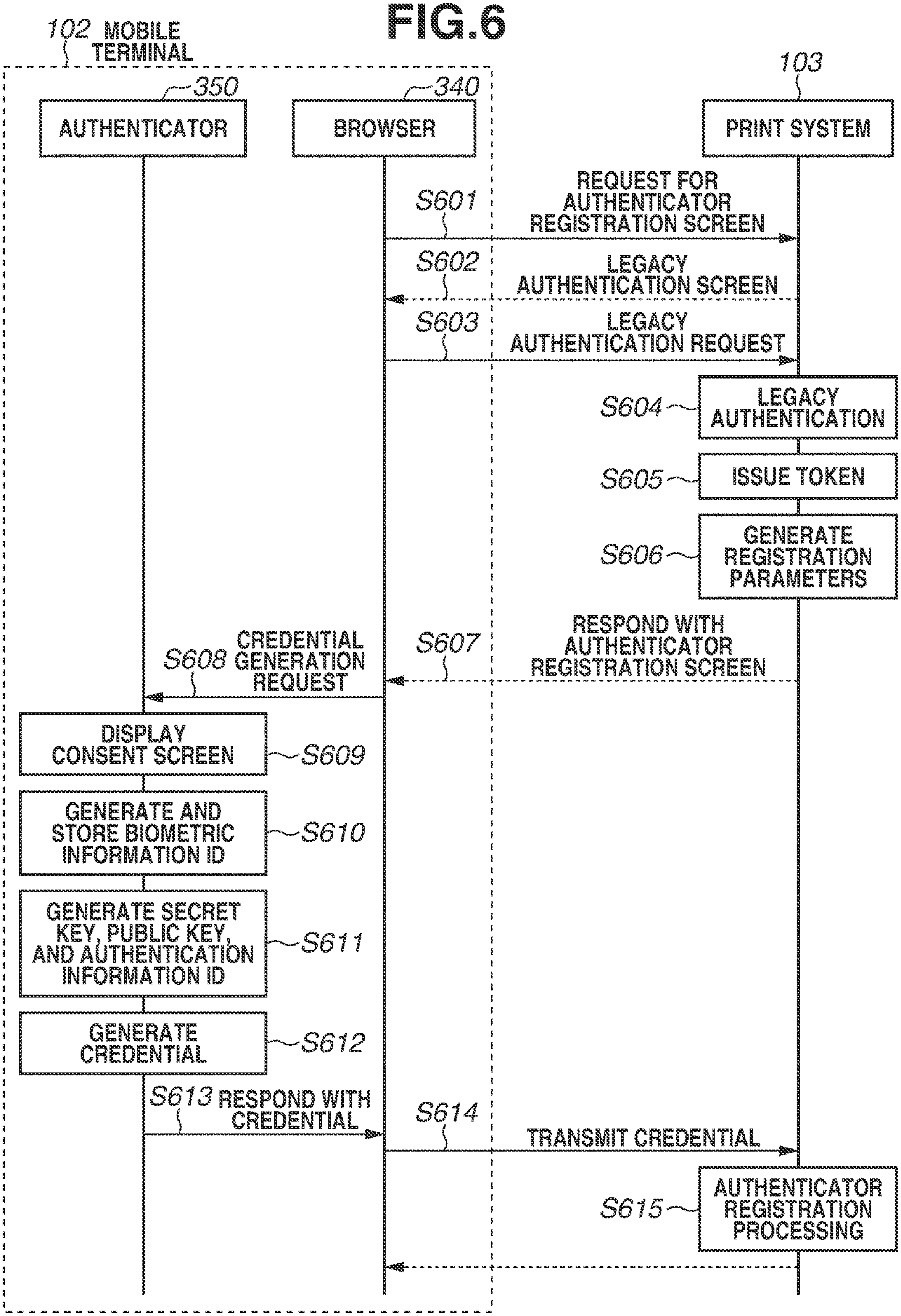
FIG. 6 is a sequence diagram illustrating processing for registering an authenticator.

FIG. 6 is a sequence diagram illustrating the processing of the mobile terminal 102 and the print system 103 related to the registration of the authenticator 350. The user initially inputs the URL of the authenticator registration screen into the browser 340 of the mobile terminal 102.

In step S601, the browser 340 of the mobile terminal 102 accepts the input of the URL of the authenticator registration screen, and makes a request for the authenticator registration screen to the print service 370. Since authentication is not yet performed at the first access, the request is redirected to the legacy authentication screen. In step S602, the print service 370 returns the legacy authentication screen to the browser 340. The display unit 341 of the browser 340 displays the legacy authentication screen, and accepts input of a user ID and a password. If the input of a user ID and a password by user operations is accepted, then in step S603, the communication unit 342 of the browser 340 transmits a legacy authentication request, in which the accepted user ID and password are set as parameters, to the print service 370.

In step S604, the legacy authentication processing unit 371 of the print service 370 performs legacy authentication. If the legacy authentication results in an error, the legacy authentication processing unit 371 returns an authentication error to the browser 340 of the mobile terminal 102. The sequence diagram of FIG. 6 illustrates a case where the legacy authentication succeeds. In step S605, the token management unit 379 of the print service 370 issues a token. The user information storage unit 375 manages information about the token in the token management table described with reference to Table F.

In step S606, the authenticator information processing unit 372 generates registration parameters 700. The registration parameters 700 will be described with reference to FIG. 7A.

The registration parameters 700 include account information 701, an encryption parameter 702, an attestation challenge 703, and an authentication extension area 704. The account information 701 indicates the user ID identified by the legacy authentication in step S604 and attribution information, such as a mail address, associated with the user ID in the print service 370. The encryption parameter 702 indicates attribute information about authentication information to be registered. Examples of the attribute information include an encryption algorithm supported by the print service 370. The attestation challenge 703 is a parameter serving as verification data to be used for challenge response authentication. The attestation challenge 703 is generated when the registration parameters 700 are generated in step S606, and is stored in the attestation challenge management table in association with the user ID and the expiration date. The authentication extension area 704 stores an extension parameter that the print service 370 can specify to control the operation of the authenticator 350. In step S607, the communication unit 374 of the print service 370 responds to the browser 340 of the mobile terminal 102 with the authenticator registration screen generated by the presentation unit 378. The token issued in step S605 and the registration parameters 700 generated in step S606 are included in the response of step S607.

In step S608, the authenticator registration control unit 343 of the browser 340 makes a credential generation request to the authenticator 350. The processing of step S608 is performed when the display unit 341 of the browser 340 reads the authenticator registration screen. For example, the processing of step S608 is performed when an onload event occurs. The credential generation request of step S608 includes registration request data 720. The registration request data 720 will be described with reference to FIG. 7B.

The registration request data 720 includes the registration parameters 700 received from the print service 370, a print service ID 721, and a web origin 722. The web origin 722 is the origin of the print service 370. The print service ID 721 stores information about the top- and second-level domains of the print service 370. For example, if the URL of the print service 370 is http://www.pull-print.com, the print service ID 721 is pull-print.com.

Figure 8:
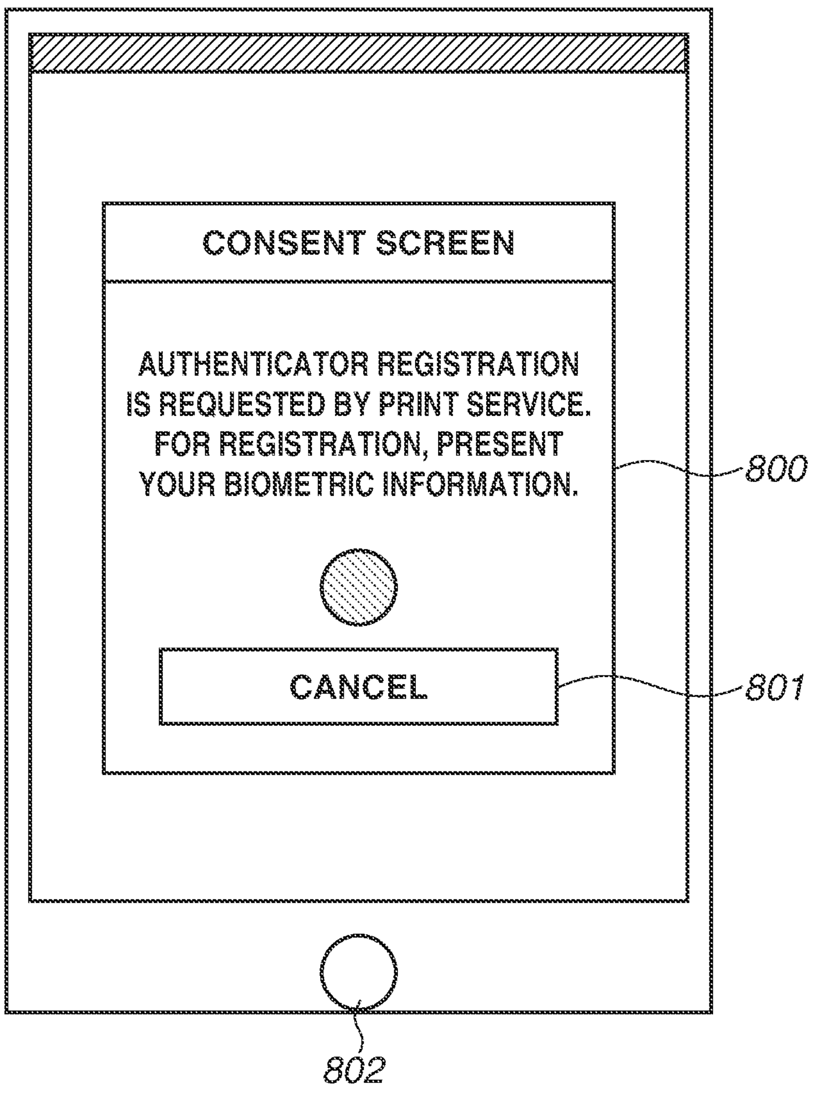
FIG. 8 is a diagram illustrating an example of a screen displayed on a mobile terminal when an authenticator is registered.

Returning to the description of FIG. 6, in step S609, the biometric information request unit 354 of the authenticator 350 displays a consent screen 800 illustrated in FIG. 8.

To register the authenticator 350 in the print service 370, the consent screen 800 prompts the user of the mobile terminal 102 to input biometric information. A button 801 is a button to cancel instead of consenting to the prompt. A button 802 includes the biometric information sensor 248 and reads biometric information such as a fingerprint. The biometric information can include information about veins, an iris, a voiceprint, or a face image. The mobile terminal 102 can be configured to input any one of such pieces of biometric information, or a combination of an arbitrary plurality of pieces of biometric information, as the biometric information needed for authentication.

In step S610, the authentication information storage unit 353 generates a biometric information ID for uniquely identifying the feature amount of the read biometric information and the biometric information, and stores the biometric information ID into the TPM 246. In step S611, the authenticator registration processing unit 351 generates a pair of secret and public keys and an authentication information ID corresponding to the biometric information ID. The authenticator registration processing unit 351 then causes the authentication information storage unit 353 to store the authentication information ID and the secret key generated in step S611, the biometric information ID generated in step S610, and the print service ID 721 included in the registration request data 720 into the authentication information management table (Table A) on the TPM 246.

Figure 7C:
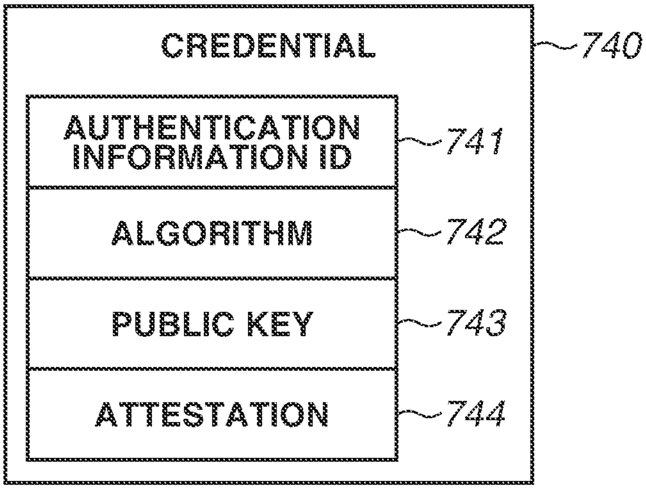

In step S612, the authenticator registration processing unit 351 generates a credential 740 illustrated in FIG. 7C.

The credential 740 includes an authentication information ID 741, an algorithm 742, a public key 743, and an attestation 744. The authentication information ID 741 and the public key 743 are data generated by the processing of step S611. The algorithm 753 corresponds to the algorithm used to generate the pair of secret and public keys in step S611. The attestation 744 is the attestation challenge 703 encrypted by using the secret key generated in step S611.

In step S613, the authenticator registration processing unit 351 responds to the browser 340 with the credential 740 generated in step S612. In step S614, the communication unit 342 of the browser 340 transmits the credential 740 received in step S613 to the print service 370 of the print system 103.

In step S615, the authenticator information processing unit 372 of the print service 370 performs authenticator registration processing by using the credential 740. The authenticator information processing unit 372 decrypts the attestation 744 included in the credential 740 by using the public key 743 included in the same credential 740 to verify that the registration request is not an unauthorized one. The authenticator information processing unit 372 of the print service 370 identifies a record of the attestation challenge management table illustrated in Table D in which the value of the attestation challenge column is the same as the value of the attestation 744 decrypted by the public key 743. The user ID of the identified record with the same value in the attestation challenge column is then associated with the credential 740. The authenticator information processing unit 372 of the print service 370 registers the authentication information ID 741 and the public key 743 included in the credential 740 and the user ID associated with the credential 740 into the authenticator information management table (Table E). Finally, the communication unit 374 of the print service 370 notifies the browser 340 of the mobile terminal 102 that the biometric information is normally registered.

<Print Processing from MFP>

Processing by which the MFP 101 obtains print data from the print system 103 and prints the print data will be described with reference to FIGS. 9 to 12B. In this example, the authentication with the print system 103 is described to be performed by using the mobile terminal 102.

Figure 9:
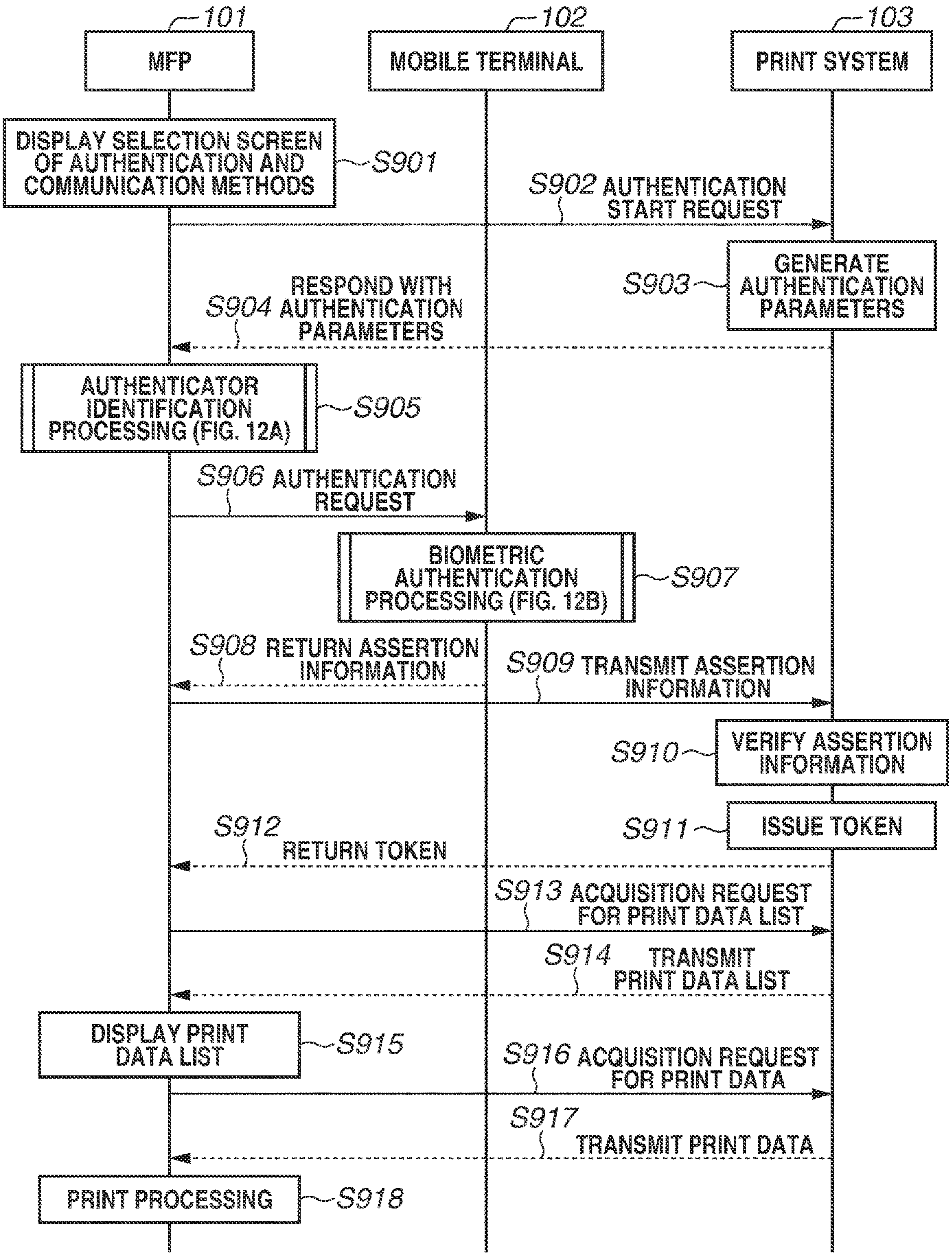
FIG. 9 is a sequence diagram illustrating print processing in a system according to a first exemplary embodiment.

FIG. 9 is a sequence diagram illustrating the processing of the MFP 101, the mobile terminal 102, and the print system 103, in which the MFP 101 obtains print data from the print system 103 and prints the print data.

In step S901, the display unit 301 of the application 300 on the MFP 101 displays a selection screen 1000 of authentication and communication methods, illustrated in FIG. 10A. The selection screen 1000 includes buttons 1001 to 1005.

The button 1001 is a button for obtaining print data by inputting a reservation code. If the user selects the button 1001, the MFP 101 transmits an acquisition request for print data, including the reservation code input by the user, to the print system 103. The print system 103 responds to the MFP 101 with print data that matches the reservation code in the print data management table (Table C). The MFP 101 performs print processing on the print data.

The button 1002 is a button for performing legacy authentication. If the user selects the button 1002, legacy authentication similar to that described in steps S602 to S604 of FIG. 6 is performed between the MFP 101 and the print system 103, instead of a method using biometric authentication described below. If the legacy authentication succeeds, the MFP 101 can obtain a list of print data corresponding to the user ID of the authenticated user, managed in the print data management table (Table C), from the print system 103.

The button 1003 is a button for performing biometric authentication by a mobile terminal that communicates with the MFP 101 by NFC.

The button 1004 is a button for performing biometric authentication by a mobile terminal that communicates with the MFP 101 by Bluetooth®. If the biometric authentication succeeds, the MFP 101 can obtain a list of print data corresponding to the user ID of the authenticated user from the print system 103.

The sequence diagram of FIG. 9 illustrates a case where the button 1003 is pressed. Whether button 1003 or 1004 is selected, the authentication processing to be performed and the parameters to be handled by each apparatus are similar, with only a difference in the communication method between the MFP 101 and the mobile terminal 102. If the display unit 301 of the application 300 accepts the pressing of the button 1003, the processing proceeds to step S902.

In step S902, the communication unit 303 of the application 300 transmits an authentication start request to the print service 370 of the print system 103.

Figure 11A:
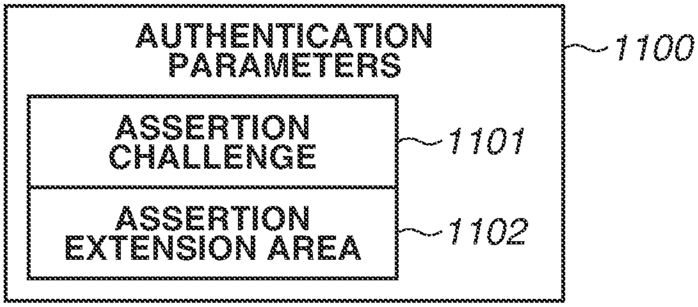
FIGS. 11A, 11B, and 11C are diagrams illustrating examples of parameters during authentication.
Figure 11B:
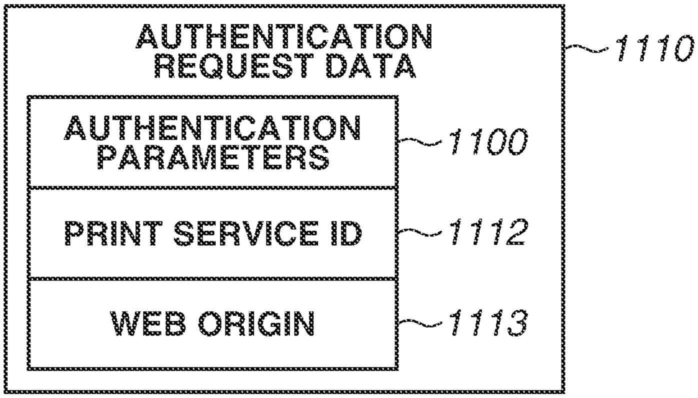

In step S903, the authenticator information processing unit 372 of the print service 370 generates authentication parameters 1100 illustrated in FIG. 11A.

The authentication parameters 1100 include an assertion challenge 1101 and an assertion extension area 1102. The assertion challenge 1101 is a parameter serving as verification data used to perform challenge response authentication. The assertion extension area 1102 stores an extension parameter that the print service 370 can specify to control the operation of the authenticator 350. In step S904, the print service 370 responds to the application 300 of the MFP 101 with the authentication parameters 1100 generated in step S903.

Figure 12B:
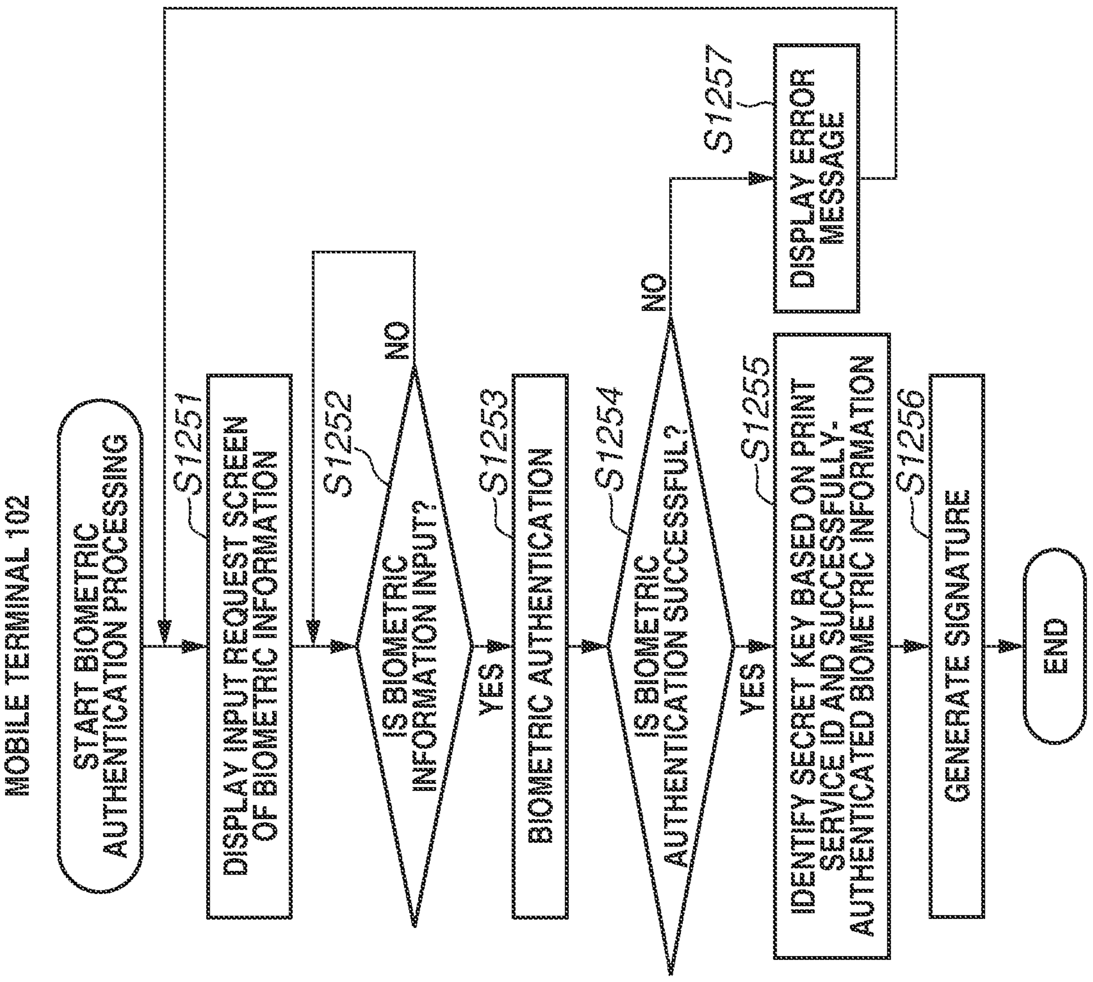
FIGS. 12A and 12B are flowcharts illustrating the processing of the MFP and a mobile terminal according to the first exemplary embodiment.
Figure 12A:
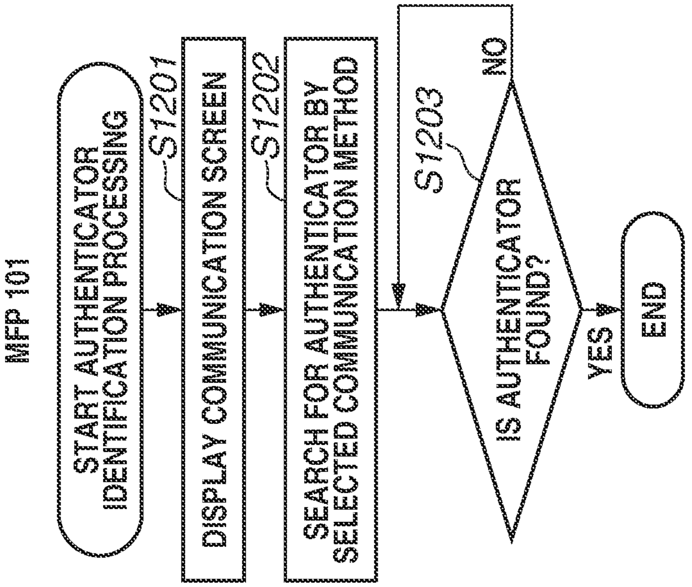

In step S905, the application 300 of the MFP 101 performs authenticator identification processing illustrated in FIG. 12A. Details of the authenticator identification processing will be described below. The processing illustrated in FIG. 9 deals with a case where the authenticator 350 of the mobile terminal 102 is found by the authenticator identification processing.

In step S906, the authentication control unit 304 of the application 300 transmits an authentication request to the authenticator 350 of the mobile terminal 102 found in step S905, along with authentication request data 1110.

The authentication request data 1110 includes the authentication parameters 1100 generated by the print service 370, a print service ID 1112, and a web origin 1113. The web origin 1113 is the origin of the print service 370. The print service ID 1112 stores information about the top- and second-level domains of the print service 370. For example, if the URL of the print service 370 is http://www.pull-print.com, the print service ID 1112 is pull-print.com.

In step S907, the authenticator 350 of the mobile terminal 102 illustrated in FIG. 12B performs biometric authentication processing. Details of the biometric authentication processing will be described below. The processing illustrated in FIG. 9 deals with a case where the biometric authentication of the user by the mobile terminal 102 in the biometric authentication processing succeeds.

Figure 11C:
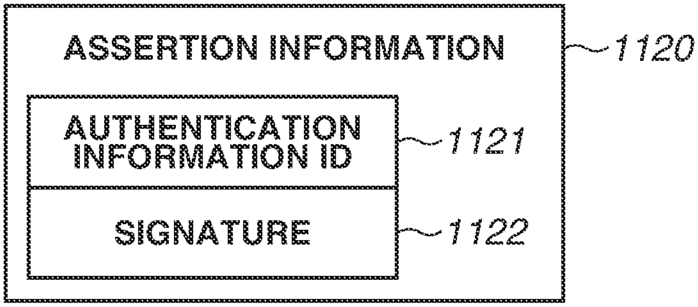

In step S908, the biometric authentication processing unit 352 of the authenticator 350 returns assertion information 1120 including a signature 1122 illustrated in FIG. 11C to the application 300 of the MFP 101. The assertion information 1120 includes an authentication information ID 1121 and the signature 1122. The signature 1122 is the assertion challenge 1101 encrypted with the secret key corresponding to the biometric authentication information about the user.

In step S909, the communication unit 303 of the application 300 transmits the assertion information 1120 received in step S908 to the print service 370 of the print system 103.

In step S910, the authenticator information processing unit 372 of the print service 370 verifies the assertion information 1120. More specifically, data obtained by decrypting the signature 1122 included in the assertion information 1120 with a public key identified by the authentication information ID 1121 is compared with the assertion challenge 1101 included in the authentication parameters 1100 generated in step S903. If the data and the assertion challenge 1101 coincide, the authenticity of the assertion information 1120 is verified. The public key is identified by using the authenticator information management table (Table E).

In step S911, the token management unit 379 of the print service 370 issues a token of the user corresponding to the assertion information 1120 verified in step S910. In step S912, the communication unit 374 of the print service 370 returns the token issued in step S911 to the application 300 of the MFP 101.

In step S913, the communication unit 303 of the application 300 transmits an acquisition request for a print data list to the print service 370 of the print system 103, along with the token received in step S912. In step S914, the communication unit 374 of the print service 370 transmits a print data list of the user associated with the token received in step S913 to the application 300 of the MFP 101. In consideration of traffic, the print data list includes the data name column and the reservation code column of the print data management table in Table C but not the value of the print data column which is binary data.

In step S915, the display unit 301 of the application 300 displays the print data list received in step S914. A print data list screen will be described with reference to FIG. 10C. A print data list screen 1040 includes a list 1041 and a button 1042. The list 1041 displays information about the print data, which is selectable. The selected piece of print data is to be printed. The button 1042 is a button for providing an instruction to perform printing. If print data is selected in the list 1041 and the display unit 301 of the application 300 accepts the pressing of the button 1042, the processing proceeds to step S916. In step S916, the communication unit 303 of the application 300 transmits an acquisition request for the print data selected on the print data list screen 1040 to the print service 370 of the print system 103.

In step S917, the communication unit 374 of the print service 370 transmits the print data specified in step S916 to the application 300 of the MFP 101. The print data transmitted in step S917 includes the print data column which is binary data.

In step S918, the execution unit 302 of the application 300 performs print processing using the received print data. This completes the processing illustrated by the present sequence.

FIG. 12A is a flowchart describing details of the authenticator identification processing of the MFP 101.

In step S1201, the display unit 301 of the application 300 displays a communication screen 1020 illustrated in FIG. 10B on the display device. The processing proceeds to step S1202. The communication screen 1020 is a screen that prompts the user to communicate with the mobile terminal 102 by the communication method selected on the selection screen 1000 of authentication and communication methods. A text display area 1021 displays a message prompting for NFC communication. If the button 1004 for selecting the Bluetooth® communication method is selected on the selection screen 100 of authentication and communication methods, the text display area 1021 would display a message prompting pairing by Bluetooth®.

In step S1202, the authentication control unit 304 of the application 300 searches for an authenticator by the communication method selected on the selection screen 1000 of authentication and communication methods. In step S1203, the authentication control unit 304 of the application 300 determines whether an authenticator is found. If no authenticator is found (NO in step S1203), the processing returns to step S1203 and the authentication control unit 304 continues the search. If an authenticator is found (YES in step S1203), the processing proceeds to step S906.

As described above, the MFP 101 searches for an authenticator by the communication method selected on the selection screen 1000 of authentication and communication methods. This enables identification processing for using the authenticator 350 of the user's mobile terminal 102.

FIG. 12B is a flowchart describing details of the biometric authentication processing of the mobile terminal 102.

Figure 13:
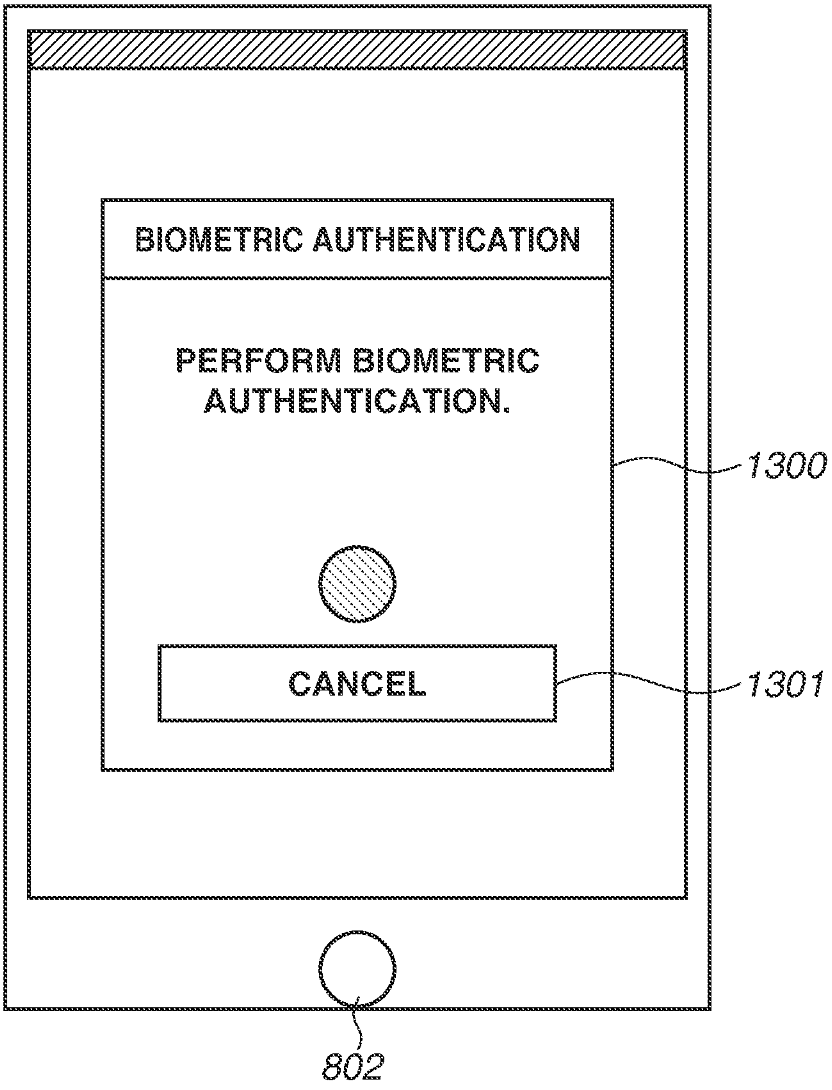
FIG. 13 is a diagram illustrating an example of a screen displayed on the mobile terminal during biometric authentication according to the first exemplary embodiment.

In step S1251, the biometric information request unit 354 of the authenticator 350 displays an input request screen 1300 of biometric information, illustrated in FIG. 13. The input request screen 1300 prompts the user of the mobile terminal 102 triggered by NFC or Bluetooth® to communicate with the MFP 101 as described above to input biometric information. A button 1301 is a button for cancelling the input of biometric information. If the button 1301 is pressed, the processing of the flowchart illustrated in FIG. 12B ends, and the processing of the sequence illustrated in FIG. 9 ends. The button 802 includes the biometric information sensor 248 and reads biometric information.

In step S1252, the biometric information request unit 354 of the authenticator 350 monitors whether biometric information is input by the user. If biometric information is input (YES in step S1252), the processing proceeds to step S1253. If biometric information is not input (NO in step S1252), the processing returns to step S1252 and the biometric information request unit 354 continues monitoring.

In step S1253, the biometric authentication processing unit 352 of the authenticator 350 obtains a feature amount of the input biometric information about the user, and performs biometric authentication by collating the feature amount with information already stored in the TPM 246 by the authentication information storage unit 353. The feature amount is information unique to an individual, such as a fingerprint pattern, an iris pattern, or a vein shape, converted into a value without losing the uniqueness. Identifying an individual by using such a feature amount unique to the individual is biometric authentication.

In step S1254, the biometric authentication processing unit 352 of the authenticator 350 determines whether the biometric authentication succeeds. If the biometric authentication succeeds (YES in step S1254), the processing proceeds to step S1255. If the biometric authentication fails (NO in step S1254), the processing proceeds to step S1257.

In step S1255, the biometric authentication processing unit 352 of the authenticator 350 identifies the corresponding secret key in the authentication information management table (Table A), based on the print service ID 1112 and the biometric information successfully authenticated in step S1253. In step S1256, the biometric authentication processing unit 352 of the authenticator 350 generates the signature 1122 from the assertion challenge 1101 by using the identified secret key.

In step S1257, the biometric information request unit 354 of the authenticator 350 displays a message indicating that the biometric authentication results in an error. The processing then proceeds to step S1251. In step S1251, the biometric information request unit 354 prompts biometric authentication again. While not described in the present example, the biometric information request unit 354 can be configured to, if the biometric authentication fails a plurality of times, end the processing of the sequence illustrated in FIG. 9, considering that the biometric authentication processing of step S907 is erroneous.

In the first exemplary embodiment, when the user uses a network service such as a print service from the image processing apparatus, the user can select the mechanism of authentication for the service based on an authentication result of biometric authentication on the user's mobile terminal 102. This can provide a secure authentication method and a mechanism of high convenience to the user, compared to a case where a system using an apparatus (image processing apparatus) that can be installed in a public space employs only legacy authentication.

In the first exemplary embodiment, biometric authentication is performed if the button 1003 or 1004 is pressed on the selection screen 100 of authentication and communication methods. If the biometric authentication succeeds, a print data list is obtained from the print system 103. In a second exemplary embodiment, an example of prompting input of a reservation code if the button 1003 or 1004 is pressed will be described. Only differences will be described with reference to FIGS. 9, 14A, and 14B.

Figure 14A:
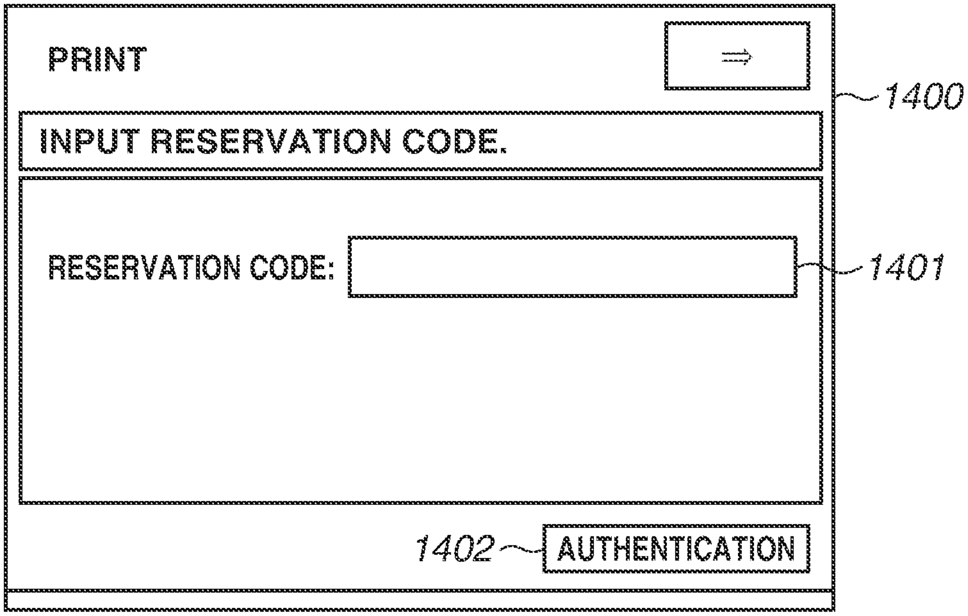
FIGS. 14A and 14B are diagrams illustrating examples of screens displayed on an MFP according to a second exemplary embodiment.

FIG. 14A illustrates a reservation code input screen that is displayed after the button 1003 or 1004 is pressed on the selection screen 1000 of authentication and communication methods. A reservation code input screen 1400 is a screen displayed by the display unit 301 of the application 300. A reservation code input text box 1401 is a text box for accepting input of a reservation code. An authentication button 1402 is a button for starting biometric authentication. If the authentication button 1402 is pressed, the processing of step S902 and subsequent steps described in FIG. 9 according to the first exemplary embodiment is performed. Steps S902 to S912 are similar to those of the first exemplary embodiment.

In the second exemplary embodiment, in step S913, the communication unit 303 of the application 300 transmits an acquisition request for a print data list to the print service 370 of the print system 103, with the reservation code input from the reservation code input screen 1400 added to the acquisition request. In step S914, the communication unit 374 of the print service 370 identifies print data of which the user is associated with the token received in step S913 and the reservation code coincides. The communication unit 374 transmits the identified print data to the application 300 of the MFP 101.

In step S915, the print data list is displayed. Since the print data list is narrowed down by the reservation code in step S914, the display is limited to only the print data corresponding to the reservation code. A plurality of pieces of print data simultaneously registered may be associated with the reservation code.

Figure 14B:
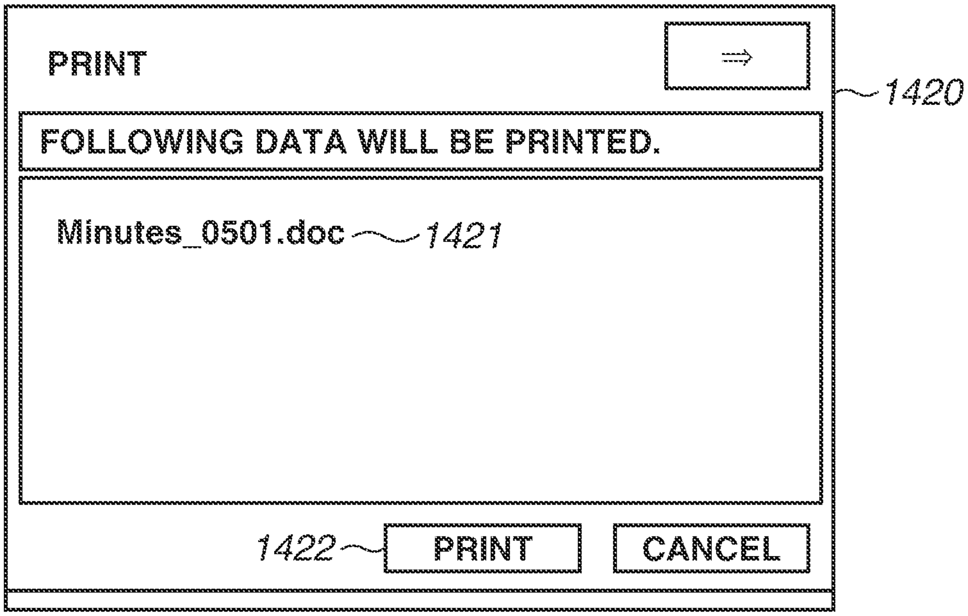

FIG. 14B illustrates an example of a print data list screen displayed by the processing of step S915 according to the second exemplary embodiment. A print data list screen 1420 includes a text area 1421 and a print start button 1422. The text area 1421 displays the data name of the print data. Only one entry corresponding to the reservation code is displayed here. The print start button 1422 is a button for starting printing. If the display unit 301 of the application 300 detects the pressing of the print start button 1422, the processing of step S916 and subsequent steps is performed.

In the present example, the print data list screen 1420 is displayed so that the user can check the contents of the print data. However, since the print data is narrowed down to one entry, the MFP 101 can automatically obtain the target print data and perform the print processing without displaying the print data list screen 1420.

Application Example

In the first and second exemplary embodiments, the print service is described as an example of the service provided on the network 105. Exemplary embodiments are also applicable to other services.

Figure 15:
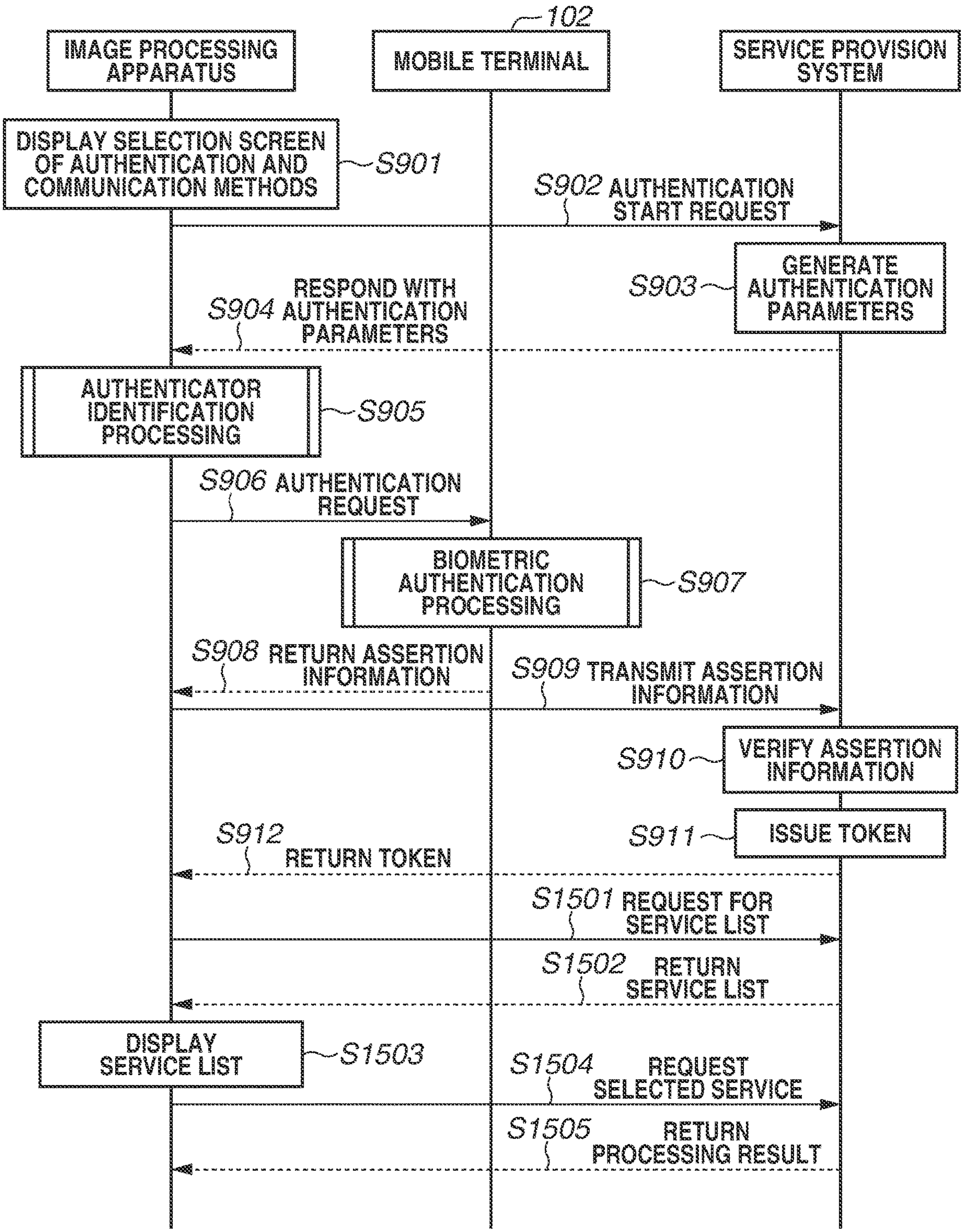
FIG. 15 is a sequence diagram illustrating an application example of the present disclosure.

FIG. 15 illustrates a case where an exemplary embodiment is applied to services other than the print service. The processing of steps S901 to S912 in FIG. 15 is similar as that described with reference to FIG. 9. A description thereof is thus omitted.

In step S1501, the image processing apparatus makes a request for a service list to a service provision system that provides a not-illustrated network service. In step S1502, the service provision system returns a list of services available for the authenticated user.

For example, if the service provision system provides a storage service, the storage provision system returns a list of storage locations that the authenticated user can use to the application 300 of the image processing apparatus. If the service provision system provides an operation workflow service, the service provision system returns a list of work processes available for the authenticated user to the application 300 of the image processing apparatus.

In step S1503, the image processing apparatus displays the returned service list. The image processing apparatus then accepts a selection from the displayed service list. In step S1504, the image processing apparatus requests the selected service from the service provision system. If the service provision system is a storage service and the image processing apparatus is the MFP 101, the MFP 101 makes the request by transmitting information indicating the selected storage location and data scanned as the data to be registered to the service provision system. If the image processing apparatus is a camera, the camera makes the request by transmitting the information indicating the selected storage location and data captured as the data to be registered to the service provision system.

In step S1505, the service provision system returns the processing result to the image processing apparatus.

The sequence illustrated in FIG. 15 conceptually includes the mechanism of download printing, which is described in the first and second exemplary embodiments. More specifically, in step S1502, a list of print jobs of the authenticated user is returned to the image processing apparatus. In step S1503, the image processing apparatus displays the job list, and the user selects a job. In steps S1504 and S1505, the image processing apparatus makes an acquisition request for the selected job as a selected service, and print processing is then performed.

In steps S1503 and S1504, a plurality of services can be simultaneously selected and requested.

An apparatus or system configured by combining the foregoing exemplary embodiments as appropriate and a method thereof are also covered by the present disclosure.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102858, filed May 24, 2017, which is hereby incorporated by reference herein in its entirety.

What is claimed is:

1. An image processing apparatus having an operation unit and a communication function capable of communicating with a mobile terminal including an authentication module for biometric authentication and a storage area having tamper resistance, wherein the storage area stores biometric information about a user and a secret key for the user having the biometric information, the biometric information being needed when the authentication module performs authentication processing, the image processing apparatus comprising:

a memory storing instructions; and at least one processor executing the instructions to cause the image processing apparatus to:

receive a first option of options related to an authentication method based on an operation by the user, wherein the options include the first option required to use the mobile terminal and a second option not required to use the mobile terminal;

transmit a request to a service provision system;

identify, in a case where the received first option corresponds to an authentication method using the authentication module of the mobile terminal communicated by the communication function, the mobile terminal including the authentication module based on a result of a search using the communication function;

transmit, to the identified mobile terminal, verification data received based on the request having been transmitted to the service provision system; and transmit, in a case where signature data generated, after a success of authentication processing of the user by the authentication module of the identified mobile terminal, by using the verification data and the secret key stored in the storage area of the mobile terminal is returned from the identified mobile terminal, the signature data to an issuer of the verification data, wherein the service provision system provides a service for the user to the image processing apparatus when the signature data is verified by using the public key managed in association with a user identifier (ID) of the user of the mobile terminal, wherein the instructions further cause the image processing apparatus to display a screen related to the service provided by the service provision system, wherein the second option corresponds to an authentication method based on an input of a code by the user via the operation unit, and wherein the instructions further cause the image processing apparatus to, in a case where the second option is selected, display an input screen for inputting the code and accept the code via the displayed input screen using the operation unit.

2. The image processing apparatus according to claim 1, wherein the instructions further cause the image processing apparatus to display a guidance screen for guidance related to the authentication method as the received option, in response to the operation by the user.

3. The image processing apparatus according to claim 1, wherein the service provision system, in a case where the signature data is verified, further provides the image processing apparatus with data as the service, the data being registered in the service provision system by the user, and wherein the image processing apparatus performs print processing based on the provided data.

4. The image processing apparatus according to claim 1, wherein a code issued by the service provision system is accepted when the second option is selected, and wherein the image processing apparatus receives data corresponding to the code from the service provision system.

5. The image processing apparatus according to claim 1, wherein the service provision system, in a case where the signature data is verified, further provides the image processing apparatus with information as the service, the information indicating a storage location available for the user, and wherein the image processing apparatus transmits data in response to the provided information indicating the storage location.

6. The image processing apparatus according to claim 5, further comprising an image input device for inputting the data to be transmitted in response to the information indicating the storage location.

7. The image processing apparatus according to claim 1, wherein the biometric information is information related to one or more of a fingerprint, a vein, an iris, a voiceprint, and a face image of the user.

8. The image processing apparatus according to claim 1, wherein the mobile terminal is a smartphone.

9. The image processing apparatus according to claim 1, wherein a user ID and a password for the service provision system are accepted when the second option is selected.

10. A method for an image processing apparatus having an operation unit and a communication function capable of communicating with a mobile terminal including an authentication module for biometric authentication and a storage area storing biometric information about a user and a secret key for the user having the biometric information, the biometric information being needed when the authentication module performs authentication processing, the method comprising:

receiving a first option of options related to an authentication method based on an operation by the user, wherein the options include the first option required to use the mobile terminal and a second option not required to use the mobile terminal;

transmitting a request to a service provision system;

identifying, in a case where the received first option corresponds to an authentication method using the authentication module of the mobile terminal communicated by the communication function, the mobile terminal including the authentication module based on a result of a search using the communication function;

transmitting, to the identified mobile terminal, verification data received based on the request having been transmitted to the service provision system; and transmitting, in a case where signature data generated, after a success of authentication processing of the user by the authentication module of the identified mobile terminal, by using the verification data and the secret key stored in the storage area of the mobile terminal is returned from the identified mobile terminal, the signature data to an issuer of the verification data, wherein the service provision system provides a service for the user to the image processing apparatus when the signature data is verified by using the public key managed in association with a user identifier (ID) of the user of the mobile terminal, wherein the image processing apparatus displays a screen related to the service provided by the service provision system, wherein the second option corresponds to an authentication method based on an input of a code by the user via the operation unit, and wherein, in a case where the second option is selected, the image processing apparatus displays an input screen for inputting the code and accepts the code via the displayed input screen using the operation unit.

11. A non-transitory computer readable storage medium on which is stored a computer program for making a computer execute a method for an image processing apparatus having an operation unit and a communication function capable of communicating with a mobile terminal including an authentication module for biometric authentication and a storage area storing biometric information about a user and a secret key for the user having the biometric information, the biometric information being needed when the authentication module performs authentication processing, the method comprising:

receiving a first option of options related to an authentication method based on an operation by the user, wherein the options include the first option required to use the mobile terminal and a second option not required to use the mobile terminal;

transmitting a request to a service provision system;

identifying, in a case where the received first option corresponds to an authentication method using the authentication module of the mobile terminal communicated by the communication function, the mobile terminal including the authentication module based on a result of a search using the communication function;

transmitting, to the identified mobile terminal, verification data received based on the request having been transmitted to the service provision system; and transmitting, in a case where signature data generated, after a success of authentication processing of the user by the authentication module of the identified mobile terminal, by using the verification data and the secret key stored in the storage area of the mobile terminal is returned from the identified mobile terminal, the signature data to an issuer of the verification data, wherein the service provision system provides a service for the user to the image processing apparatus when the signature data is verified by using the public key managed in association with a user identifier (ID) of the user of the mobile terminal, wherein the image processing apparatus displays a screen related to the service provided by the service provision system, wherein the second option corresponds to an authentication method based on an input of a code by the user via the operation unit, and wherein, in a case where the second option is selected, the image processing apparatus displays an input screen for inputting the code and accepts the code via the displayed input screen using the operation unit.

12. A system including a mobile terminal including an authentication module for biometric authentication and a storage area storing biometric information about a user and a secret key for the user generated in registering the biometric information, the biometric information being needed when the authentication module performs authentication processing, an image processing apparatus having an operation unit and a communication function capable of communicating with the mobile terminal, and a service provision system that provides a service for a user of the mobile terminal, wherein the image processing apparatus comprises a first memory storing instructions and at least one processor executing the instructions stored in the first memory to cause the image processing apparatus to:

receive a first option of options related to an authentication method based on an operation by the user, wherein the options include the first option required to use the mobile terminal and a second option not required to use the mobile terminal;

transmit a request to a service provision system;

identify, in a case where the received first option corresponds to an authentication method using the authentication module of the mobile terminal communicated by the communication function, the mobile terminal including the authentication module based on a result of a search using the communication function; and transmit, to the identified mobile terminal, verification data received based on the request having been transmitted to the service provision system, wherein the mobile terminal comprises a second memory storing instructions and at least one processor executing the instructions stored in the second memory to cause the mobile terminal to:

generate, after a success of authentication processing of the user by the authentication module of the mobile terminal, signature data by using the verification data and the secret key stored in the storage area; and return the signature data to the image processing apparatus, wherein the instructions stored in the first memory further cause the image processing apparatus to transmit the returned signature data to an issuer of the verification data, wherein the service provision system provides a service for the user to the image processing apparatus when the signature data is verified by using the public key managed in association with a user identifier (ID) of the user of the mobile terminal, wherein the instructions stored in the first memory further cause the image processing apparatus to display a screen related to the service provided by the service provision system, wherein the second option corresponds to an authentication method based on an input of a code by the user via the operation unit, and wherein the instructions stored in the first memory further cause the image processing apparatus to, in a case where the second option is selected, display an input screen for inputting the code and accept the code via the displayed input screen using the operation unit.

13. The system according to claim 12, wherein the instructions stored in the second memory further cause the mobile terminal to generate the secret key and the public key when the biometric information about the user is registered in the authentication module, and wherein the public key transmitted from the mobile terminal is registered in the issuer of the verification data in association with the user identifier (ID) of the user using the service provision system, for sake of verification of the signature data.

* * * * *